(12) United States Patent
Suzuki et al.

(10) Patent No.: US 9,102,126 B2
(45) Date of Patent: Aug. 11, 2015

(54) READILY REMOVABLE FILM, LABEL FOR IN-MOLD MOLDING, MOLDED RESIN ARTICLE HAVING LABEL ATTACHED THERETO, WALLPAPER, GLUE LABEL, AND CONTAINER HAVING LABEL ATTACHED THERETO

(75) Inventors: Tatsuya Suzuki, Ibaraki (JP); Kou Nakamura, Ibaraki (JP); Kazuyuki Kimura, Ibaraki (JP); Seiichiro Iida, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 13/806,435

(22) PCT Filed: Jun. 30, 2011

(86) PCT No.: PCT/JP2011/065098
§ 371 (c)(1),
(2), (4) Date: Mar. 11, 2013

(87) PCT Pub. No.: WO2012/002510
PCT Pub. Date: Jan. 5, 2012

(65) Prior Publication Data
US 2013/0164471 A1    Jun. 27, 2013

(30) Foreign Application Priority Data

Jun. 30, 2010 (JP) .................... 2010-149446
Dec. 22, 2010 (JP) .................... 2010-285464
Mar. 31, 2011 (JP) .................... 2011-080735
Mar. 31, 2011 (JP) .................... 2011-080736

(51) Int. Cl.
*B32B 27/08* (2006.01)
*B32B 27/32* (2006.01)
(Continued)

(52) U.S. Cl.
CPC . *B32B 27/08* (2013.01); *B32B 3/10* (2013.01); *B32B 3/263* (2013.01); *B32B 3/266* (2013.01);
(Continued)

(58) Field of Classification Search
CPC ............ B41M 5/00; B41M 5/41; G09F 3/04; G09F 3/02; G09F 3/10; C08J 7/065; C08J 2323/02; B32B 7/06; B32B 27/08; B32B 27/32; B32B 5/16; B32B 33/00; B32B 3/263; B32B 3/266; B32B 3/10; E04F 13/002; C09J 7/0296; Y10T 428/2848; Y10T 428/24331; Y10T 428/2335; Y10T 428/24802; Y10T 428/24851
USPC ........... 428/35.2, 35.7, 40.1, 323, 523, 904.4
See application file for complete search history.

(56) References Cited

U.S. PATENT DOCUMENTS 6,534,150 B1   3/2003   Yamanaka et al.
6,576,325 B1   6/2003   Yamanaka et al.
(Continued)

FOREIGN PATENT DOCUMENTS

EP    254923    2/1988
JP    58-69015  4/1983
(Continued)

OTHER PUBLICATIONS
Search report from International Application No. PCT/JP2011/065098.
(Continued)

*Primary Examiner* — Gwendolyn Blackwell
*Assistant Examiner* — Lee Sanderson
(74) *Attorney, Agent, or Firm* — Greenblum & Bernstein, P.L.C.

(57) ABSTRACT

A readily removable film containing a substrate layer (A) and a readily removable layer (B), wherein the substrate layer (A) contains a thermoplastic resin, the readily removable layer (B) contains from 30 to 60% by weight of a mixture of a crystalline polypropylene resin having a degree of crystallinity of at least 65% and a thermoplastic resin immiscible with the crystalline polypropylene resin, and from 40 to 70% by weight of a fine powder, in which the thermoplastic resin immiscible with the crystalline polypropylene resin is blended in a ratio of from 105 to 300 parts by weight relative to 100 parts by weight of the crystalline polypropylene resin, and the readily removable layer (B) is stretched at least monoaxially.

6 Claims, 3 Drawing Sheets

(51) Int. Cl.
    *B32B 7/06*     (2006.01)
    *C09J 7/02*     (2006.01)
    *G09F 3/10*     (2006.01)
    *G09F 3/04*     (2006.01)
    *B32B 5/16*     (2006.01)
    *B32B 33/00*     (2006.01)
    *B32B 3/26*     (2006.01)
    *B32B 3/10*     (2006.01)
    *E04F 13/00*     (2006.01)
    *G09F 3/02*     (2006.01)

(52) U.S. Cl.
    CPC ... *B32B 5/16* (2013.01); *B32B 7/06* (2013.01); *B32B 27/32* (2013.01); *B32B 33/00* (2013.01); *C09J 7/0296* (2013.01); *E04F 13/002* (2013.01); *G09F 3/04* (2013.01); *G09F 3/02* (2013.01); *G09F 3/10* (2013.01); *Y10T 428/1352* (2015.01); *Y10T 428/24331* (2015.01); *Y10T 428/24355* (2015.01); *Y10T 428/24802* (2015.01); *Y10T 428/25* (2015.01); *Y10T 428/265* (2015.01); *Y10T 428/2848* (2015.01)

(56) References Cited

U.S. PATENT DOCUMENTS

| | | | |
|---|---|---|---|
| 7,981,503 B2 * | 7/2011 | Kimura et al. | 428/317.7 |
| 8,048,533 B2 * | 11/2011 | Kimura et al. | 428/537.5 |
| 2003/0219585 A1 | 11/2003 | Yamanaka et al. | |
| 2005/0186371 A1 * | 8/2005 | Kimura et al. | 428/35.2 |
| 2007/0003777 A1 | 1/2007 | Iwasa et al. | |
| 2009/0169780 A1 | 7/2009 | Kimura et al. | |
| 2010/0126991 A1 * | 5/2010 | Kimura et al. | 220/200 |
| 2013/0164471 A1 * | 6/2013 | Suzuki et al. | 428/35.7 |

FOREIGN PATENT DOCUMENTS

| | | |
|---|---|---|
| JP | 2-7814 | 2/1990 |
| JP | 2-84319 | 3/1990 |
| JP | 4-29184 | 1/1992 |
| JP | 6-173200 | 6/1994 |
| JP | 7-507397 | 8/1995 |
| JP | 11-293600 | 10/1999 |
| JP | 11-348192 | 12/1999 |
| JP | 2002-200707 | 7/2002 |
| JP | 2003-295767 | 10/2003 |
| JP | 2004-68017 | 3/2004 |
| JP | 2004-347658 | 12/2004 |
| JP | 2005-208615 | 8/2005 |
| JP | 2006-15560 | 1/2006 |
| JP | 2006-276848 | 10/2006 |
| JP | 2006-309175 | 11/2006 |
| JP | 2007-197088 | 8/2007 |
| JP | 2008-179418 | 8/2008 |
| JP | 2009-84836 | 4/2009 |
| WO | 00/36040 | 6/2000 |
| WO | 02/28949 | 4/2002 |

OTHER PUBLICATIONS

International Preliminary Report on Patentability and Written Opinion of the Searching Authority for International Application No. PCT/JP2011/065098.

Japanese Office Action for Application No. 2011-145651, which was mailed on Mar. 17, 2015.

* cited by examiner

READILY REMOVABLE FILM, LABEL FOR IN-MOLD MOLDING, MOLDED RESIN ARTICLE HAVING LABEL ATTACHED THERETO, WALLPAPER, GLUE LABEL, AND CONTAINER HAVING LABEL ATTACHED THERETO

TECHNICAL FIELD

The present invention relates to a readily removable film, and to a readily removable film useful as wallpaper adherable to building materials or adherable to glass-made or resin-made bottles. The readily removable film of the invention can be readily adherable to building materials, bottles and others directly via an adhesive but not requiring lining material of natural paper, and when the film is removed from building materials and bottles, the readily removable layer remains as a uniform layer on the side of the adherend, and therefore does not leave any rough irregularities on the surface of the adherend from which the film has been removed, and in addition, the surface of the adherend can be a state capable of absorbing liquid and therefore accepts re-adhering thereto. In addition, the film itself can be readily removed while it is recyclable, and is therefore advantageous for waste reduction.

The invention also relates to an in-mold molding label comprising the readily removable film. More concretely, the invention relates to an in-mold molding label for blow molding of introducing a molten thermoplastic resin parison into a mold followed by molding it therein by pressurization, or for injection molding of introducing a molten thermoplastic resin into a mold followed by molding it by the resin pressure, or reduce-pressure or increased-pressure molding of introducing a molten thermoplastic resin sheet into a mold followed by molding it under reduced pressure or increased pressure, wherein the label is previously arranged so as to face the inner wall surface of the mold, and therefore in that condition, while the molten thermoplastic resin is introduced into the mold and molded into a resin molded article, a label-attached resin molded article can be produced in which the label and the resin molded article are integrated.

BACKGROUND ART

Heretofore, as the substrate for wallpaper of architectural decorative materials, or for a label for containers such as glass bottles, resin bottles and the like, polyolefin films and calender-molded films that comprising, as the main ingredient thereof, a polyvinyl chloride (PVC) resin have been much used. In general, these resin films alone could hardly absorb an adhesive agent by themselves, and are therefore laminated with a water-absorbing resin layer on the adhesive side thereof (for example, Patent Document 1), or are lined with any other material.

The film laminated with such a water-absorbing layer can be stuck to an adherend with a solvent-based or water-based adhesive. However, when the film laminated with such a water-absorbing layer is removed from the adherend, it partially leaves the broken water-absorbing layer on the adherend, or it may break the material of the adherend. As a result, the removed surface could not be uniform, and when a wallpaper or a label is again stuck to the side of the adherend, then the irregularities below it would stand out on the surface thereof and the appearance of the re-stuck adherend would be thereby worsened. Owing to the problem, re-sticking is impossible.

There is another problem in that the film removed in wallpaper or label changing could not be directly recycled as a material thereof. For directly recycling the removed film, the film and the adhesive must be separated from each other, or the film and the lining material must be separated from each other. In general, however, these firmly bond to each other, and separating them is difficult.

Consequently, in case where wallpapers and labels of any type are recycled, any other materials than resin would have been mixed therein and these may be thermally decomposed to generate impurities, whereby the flowable characteristics of the resin may greatly fluctuate. As a result, there occurs a severe problem of quality, and material recycling itself is therefore difficult.

For solving these problems, there have been proposed a wallpaper and a label which have been specifically so designed that the resin material and the lining material therein can be separated from each other. For example, there have been proposed a wallpaper that comprises a PVC resin layer and, as formed thereon, a coating layer of a lining material comprising a water-soluble polymer and a binder containing a vinyl chloride-based or vinyl acetate-based synthetic resin as the main ingredients thereof, which is specifically so designed that PVC and the lining material therein could be separated from each other by dipping and stirring in hot water or in an alkaline aqueous water (for example, Patent Document 2), and a laminate that comprises a lining material and a foamed and gelled PVC substrate and, as sandwiched therebetween, a PET film, a PP film or the like (for example, Patent Document 3). However, these methods require an additional step of removing the lining material with a chemical, and therefore have some problems of recycling cost rise and recycled resin material quality degradation. Consequently, these methods are not as yet put into practical use. Still now, as a result, most removed wallpapers and labels are discarded for landfilling or by incineration, and are not recycled as resin materials. This is against the recent market demand.

As a case that can be stuck to an adherend such as wall, board or the like via an adhesive but not using a lining material, there has been proposed a readily removable multilayer resin stretched film which comprises a printable surface layer (A) containing a thermoplastic resin, an inorganic fine powder and/or an organic filler and, as laminated on the back thereof, a back layer (B) that contains a thermoplastic resin including a hydrophilic thermoplastic resin and a surface-treated inorganic fine powder, and in which the peeling strength of the back layer (B) is from 10 to 200 g/cm (Patent Document 4). In this reference, concretely described is an embodiment where a layer containing from 10 to 30% by weight of a crystalline polypropylene resin, from 2 to 10% by weight of a hydrophilic resin, from 13 to 25% by weight of a thermoplastic elastomer, and from 45 to 65% by weight of an inorganic fine powder of surface-hydrophilized particles is laminated on the substrate layer of the back layer (B). The embodiment would be surely favorable in that the film could be stuck to an adherend via an adhesive, even though a lining material is not used therein; however, when the film is removed from the adherend, the rupture propagation in the back layer (B) is unstable and therefore some irregularities would remain on the surface of the adherend to be an obstacle to re-sticking, and as the case may be, the rupture propagation in the back layer (B) would reach the surface layer. For these reasons, the film of the case is still required to be improved.

On the other hand, heretofore, there has been produced a label-integrated resin molded article by previously inserting a blank or a label in a mold, and then molding a container or the like in the mold by injection molding, blow molding, differential pressure molding, foam molding or the like (for example, see Patent Document 5 and Patent Document 6). The label of the type is referred to as an in-mold molding label, for which there are known a gravure-printed resin film, an offset-printed synthetic paper (for example, see Patent Document 7 and Patent Document 8), an flexoprinted synthetic paper, an aluminium label prepared by laminating a high-pressure-method low-density polyethylene or an ethylene/vinyl acetate copolymer on the back of an aluminium foil followed by gravure-printing the surface of the foil, etc.; and these have been put into practical use.

Recently, from the viewpoint of recycling plastic containers (material recycling), there has been a demand for readily separating and removing the label from a labeled plastic container produced by the use of an in-mold molding label, and there has been proposed a case where the label is so designed as to have a layer that enables interface peeling or interlayer peeling (for example, see Patent Document 9 and Patent Document 10).

In most those conventional in-mold molding labels, there is provided a heat-seal layer of high-density polyethylene or the like for bonding then to resin molded articles. In case where the material of the resin molded article is the same as the polyethylene resin of the label, the molded article could have a strong adhesion power; however, in case where the material of the resin molded article differs from that of the label, or that is, when the former is polypropylene, polystyrene, polyethylene terephthalate or the like, then the bonding power of the label to the molded article is extremely low, therefore causing a problem in that the label is readily removed from the molded article during transportation. For enhancing the adhesion between label and molded article, a label of which the heat-seal layer is formed of the same resin material as that of the molded article must be prepared, therefore providing a problem in that the label stock control would be complicated, and in addition, there has been pointed out a drawback in that, when the molding temperature of the molded article is low, a sufficient adhesion strength could not be attained between the molded article and the label and therefore the molding temperature for the molded article must be elevated and the productivity would be thereby lowered.

Given the situation, there has been proposed another case where, as the adhesive layer of the in-mold molding label, a conventional heat-seal layer of a low-melding-point resin for adhesion through thermal fusion bonding thereof is not used but a resin film having a porous surface with pores on the surface thereof is used, and owing to the anchoring effect of the molding resin to penetrate into the pores in the surface of the adhesive layer by pressure during molding, the adhesion between the label and the molded article is kept strong irrespective of the material of the molded article, therefore making it possible to label the molded article in a broad-range molding condition (for example, see Patent Document 11). However, the in-mold molding label of the type firmly adheres to resin molded articles (at 400 g/15 mm or more), and therefore it is difficult to readily peel and separate the label from the labeled resin molded article.

As described above, when labels could be readily removed from labeled resin containers that use in-mold molding labels applicable to various resin molded articles, not only the resin containers could be recycled but also printing may be applied on the surface of the adhesive layer as in Patent Document 10, and the print could be therefore confirmed after removal of the label, or that is, additional functions may be imparted to labeled resin containers for forgery prevention and recycling prevention of those containers, as well as secondary utilization of the removed labels for coupon tickets and others. Consequently, further improvements of labeled resin containers are desired.

CITATION LIST

Patent Documents

Patent Document 1: JP-A 2004-347658
Patent Document 2: JP-A 6-173200
Patent Document 3: JP-A 11-293600
Patent Document 4: JP-A 2002-200707
Patent Document 5: JP-A 58-69015
Patent Document 6: EP 254923A
Patent Document 7: JP-B 2-7814
Patent Document 8: JP-A 2-84319
Patent Document 9: JP-T 7-507397
Patent Document 10: JP-A 2003-295767
Patent Document 11: JP-A 2006-309175

SUMMARY OF INVENTION

Technical Problem

The present invention is to solve the above-mentioned problems with the prior art. Specifically, an object of the invention is to provide a readily removable film, which has excellent workability onto building materials such as walls, boards and the like or excellent applicability to glass bottles and other bottles via an adhesive but not requiring any lining material, which, when removed from the adherends, can be again stuck thereto with ease, not leaving irregularities on the surface of the adherend, and which, when removed as wallpaper or label, can be readily collected as a state that enables material recycling.

Another object of the invention is to provide an in-mold molding label, which secures firm bonding between the label and a resin molded article irrespective of the material of the resin molded article, which enables bonding of the label to a molded article in a broad-range molding condition, and which enables separation of the substrate layer of the label from in-mold molded, labeled resin molded articles.

Still another object of the invention is to provide a labeled resin molded article which is produced by the use of the in-mold molding label and in which the resin is readily recyclable, and to provide a labeled resin molded article which is previously printed on the surface of the readily removable layer (B) of the in-mold molding label therein so that, when the substrate layer (A) of the label is separated from the labeled resin molded article, the print can be visually recognized on any one of the resin molded article and the label.

Solution to Problem

The present invention solves the problems according to the following means.
[1] A readily removable film containing a substrate layer (A) and a readily removable layer (B), wherein:
the substrate layer (A) contains a thermoplastic resin,
the readily removable layer (B) contains from 30 to 60% by weight of a mixture of a crystalline polypropylene resin having a degree of crystallinity of at least 65% and a thermoplastic resin immiscible with the crystalline polypropylene resin, and from 40 to 70% by weight of a fine powder, in which the thermoplastic resin immiscible with the crystalline polypropylene resin is blended in a ratio of from 105 to 300 parts by weight relative to 100 parts by weight of the crystalline polypropylene resin, and the readily removable layer (B) is stretched at least monoaxially.

[2] The readily removable film according to [1], wherein the fine powder contains an inorganic fine powder of particles hydrophilized with a surface-treating agent on the surface thereof.

[3] The readily removable film according to [2], wherein the surface-treating agent is at least one surfactant selected from a group consisting of a water-soluble anionic surfactant, a water-soluble cationic surfactant, and a water-soluble nonionic surfactant.

[4] The readily removable film according to [2] or [3], wherein the fine powder contains from 50 to 99.9% by weight of an inorganic fine powder of particles hydrophilized on the surface thereof and from 0.1 to 50% by weight of at least one of an inorganic fine powder of particles not hydrophilized on the surface thereof and an organic fine powder.

[5] The readily removable film according to any one of [2] to [4], wherein the liquid absorption capacity of the readily removable layer (B), as measured according to "Japan TAPPI No. 51-2000", is from 1 to 20 ml/m$^2$.

[6] The readily removable film according to any one of [1] to [5], wherein the thermoplastic resin immiscible with the crystalline polypropylene resin is at least one resin selected from a group consisting of a polyethylene rein, a styrenic resin, a cyclic polyolefin resin, an ethylene/cyclic olefin copolymer resin, a polyamide resin, a polyester resin and a polycarbonate.

[7] The readily removable film according to any one of [1] to [6], wherein the readily removable layer (B) further contains a dispersant for the fine powder in an amount of from 0.5 to 30 parts by weight relative to 100 parts by weight of the fine powder.

[8] The readily removable film according to [7], wherein the dispersant is at least one of a maleic acid-modified polyolefin and a silanol-modified polypropylene.

[9] The readily removable film according to any one of [1] to [8], wherein the thickness of the readily removable layer (B) is from 0.1 to 20 μm.

[10] The readily removable film according to any one of [1] to [9], wherein the aperture ratio of the surface of the readily removable layer (B) is from 7 to 60%.

[11] The readily removable film according to any one of [1] to [10], wherein the arithmetic mean roughness of the surface of the readily removable layer (B) is from 0.3 to 1.8 μm.

[12] The readily removable film according to any one of [1] to [11], wherein the substrate layer (A) has a multilayer structure.

[13] The readily removable film according to any one of [1] to [12], which is printed on the surface of the readily removable layer (B).

[14] The readily removable film according to any one of [1] to [13], further having a masking layer (C).

[15] The readily removable film according to [14], wherein the masking layer (C) is formed according to at least one method selected from the group consisting of black printing or gray printing on the surface thereof on the side of the readily removable layer (B), or adding a masking pigment to the substrate layer (A), or insertion of black printing between the substrate layer (A).

[16] The readily removable film according to any one of [1] to [15], further having a coat layer (D) on the surface thereof on the side of the substrate layer (A).

[17] An in-mold molding label comprising the readily removable film of any one of [1] to [16].

[18] A labeled resin molded article, comprising the in-mold molding label of [17] stuck to a resin molded article.

[19] The labeled rein molded article of [18], wherein the resin molded article comprises at least one thermoplastic resin selected from a group consisting of a polypropylene resin, a polyethylene resin, a polystyrene resin, and a polyethylene terephthalate resin.

[20] The labeled resin molded article according to [18] or [19], which is such that, when the in-mold molding label is peeled from the labeled resin molded article, the peeling goes on in a mode of cohesion failure inside the readily removable layer (B).

[21] The labeled resin molded article according to any one of [18] to [20], which is such that, when the in-mold molding label is peeled from the labeled resin molded article, the stress needed for the peeling is from 40 to 160 gf/15 mm.

[22] The labeled resin molded article according to any one of [18] to [21], which is printed on the surface of the readily removable layer (B) of the in-mold molding label and which is such that, when the in-mold molding label is peeled from the labeled resin molded article, the print remains on the resin molded article.

[23] The labeled resin molded article according to any one of [18] to [22], which is printed on the surface of the readily removable layer (B) of the in-mold molding label and which is such that, when the in-mold molding label is peeled from the labeled resin molded article, the print remains on the label.

[24] A wallpaper comprising a water-based adhesive layer arranged on the surface on the side of the readily removable layer (B) of the readily removable film of any one of [1] to [16].

[25] The wallpaper according to [24], which is such that, when the wallpaper is peeled from a wall, the peeling goes on in a mode of cohesion failure inside the readily removable layer (B).

[26] The wallpaper according to [24] or [25], which is such that, when the wallpaper is peeled from a wall, the stress needed for the peeling is from 50 to 180 gf/18 mm.

[27] The wallpaper according to any one of [24] to [26], which is such that, after the wallpaper is peeled from a wall, a part of the readily removable layer (B) remains on the surface of the wall as a thin film thereon, and the residue absorbs a liquid.

[28] A glue label comprising a water-based adhesive layer arranged on the surface on the side of the readily removable layer (B) of the readily removable film of any one of [1] to [16].

[29] A labeled container, having the glue label of [28] attached thereto.

Advantageous Effects of Invention

The readily removable film of the invention can be readily stuck to adherends such as building materials, containers and others via an adhesive, not requiring any linking material. When removed from the adherends, the film can be again stuck thereto with ease, not leaving irregularities on the surface of the adherend. Another advantage of the film is that the film (as wallpaper or label) removed from adherends can be readily collected as a state that enables material recycling.

The in-mold molding label of the invention is characterized in that it secures firm bonding between the label and a resin molded article irrespective of the material of the resin molded article, enables bonding of the label to a molded article in a broad-range molding condition, and enables separation of the substrate layer of the label from in-mold molded, labeled resin molded articles.

The labeled resin molded article of the invention is characterized in that it facilitates collection and recycling of the resin molded article, and that, by previously printing the surface on the side of the readily removable layer (B) of the in-mold molding label, the print can be visually recognized on any one of the resin molded article and the substrate layer (A) when the substrate layer (A) of the label is separated from the labeled resin molded article.

DESCRIPTION OF EMBODIMENTS

Embodiments of the invention are described in detail hereinunder. The description of the constitutive elements of the invention given hereinunder is for some typical embodiments of the invention, to which, however, the invention should not be limited. In the invention, the numerical range expressed by the wording "a number to another number" means the range that falls between the former number indicating the lower limit of the range and the latter number indicating the upper limit thereof.

[Basic Constitution of Readily Removable Film]

Figure 1:
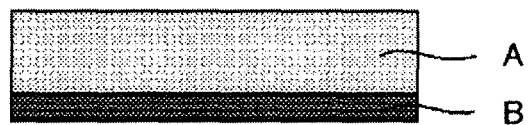
[FIG. 1] This is a cross-sectional view of one embodiment of the readily removable film of the invention.

The readily removable film of the invention contains a laminate resin film of a substrate layer (A) and a readily removable layer (B) (see FIG. 1). The in-mold molding label of the invention comprises the readily removable film having the same constitution.

[Substrate Layer (A)]

The substrate layer (A) contains a thermoplastic resin, and the strength of itself is higher than the strength of the readily removable layer (B). When the label is peeled by holding the layer (A), the strength of the layer is such that the layer itself is not broken inside it. More concretely, it is desirable that the cohesion force (peeling strength or tensile strength at break) of the substrate layer (A) itself is at least 200 gf/15 mm. The substrate layer (A) may be transparent, or semitransparent, or non-transparent.

[Thermoplastic Resin]

The type of the thermoplastic resin to be used for the substrate layer (A) is not specifically defined. For example, usable here are polyolefinic resins such as high-density polyethylene, middle-density polyethylene, low-density polyethylene, propylenic resin, polymethyl-1-pentene, ethylene/cyclic olefin copolymer, etc.; functional group-containing polyolefinic resins such as ethylene/vinyl acetate copolymer, ethylene/acrylic acid copolymer, maleic acid-modified polyethylene, maleic acid-modified polypropylene, etc.; polyamide resins such as nylon-6, nylon-6,6, etc.; thermoplastic polyester resins such as polyethylene terephthalate and its copolymer, polybutylene terephthalate, polybutylene succinate, polylactic acid, aliphatic polyester, etc.; as well as polycarbonate, atactic polystyrene, syndiotactic polystyrene, etc. Of those thermoplastic resins, preferred is use of polyolefinic resins and functional group-having polyolefinic resins as excellent in processability. More concrete examples of the polyolefinic resins include homopolymers of olefins such as ethylene, propylene, butylene, butadiene, isoprene, chloroprene, methyl-1-pentene, cyclic olefins, etc.; and copolymers of two or more different types of these olefins.

More concrete examples of the functional group-having polyolefinic resins include copolymers of the above-mentioned olefins and functional group-having monomers copolymerizable with those olefins. Especially typical examples of such functional group-having monomers include styrenes such as styrene, α-methylstyrene, etc.; vinyl carboxylates such as vinyl acetate, vinyl alcohol, vinyl propionate, vinyl butyrate, vinyl pivalate, vinyl caproate, vinyl laurate, vinyl stearate, vinyl benzoate, vinyl butylbenzoate, vinyl cyclohexanecarboxylate, etc.; acrylic acid, methacrylic acid; (meth)acrylates ((meth)acrylate is meant to indicate acrylate and methacrylate) such as methyl(meth)acrylate, ethyl (meth)acrylate, butyl(meth)acrylate, hexyl(meth)acrylate, octyl (meth)acrylate, 2-ethylhexyl(meth)acrylate, stearyl(meth)acrylate, benzyl(meth)acrylate, cyclohexyl(meth)acrylate, isobornyl(meth)acrylate, dicyclopentaenyl(meth)acrylate, (meth)acrylamide, N-methylol(meth)acrylamide, etc.; and ethers such as methyl vinyl ether, ethyl vinyl ether, propyl vinyl ether, butyl vinyl ether, cyclopentyl vinyl ether, cyclohexyl vinyl ether, benzyl vinyl ether, phenyl vinyl ether, etc. One or more may be optionally selected from these functional group-having monomers and may be used here. Further, these polyolefinic resins and functional group-having polyolefinic resins may be optionally graft-modified for use herein.

Any known method is employable for graft modification. One concrete example is graft modification with an unsaturated carboxylic acid or its derivative. The unsaturated carboxylic acid includes, for example, acrylic acid, methacrylic acid, maleic acid, fumaric acid, itaconic acid, etc. Derivatives of the unsaturated carboxylic acid include acid anhydrides, esters, amides, imides and metal salts, and these are also usable here. Concretely, there are mentioned maleic anhydride, itaconic anhydride, citraconic anhydride, methyl acrylate, ethyl acrylate, methyl methacrylate, ethyl methacrylate, butyl acrylate, butyl methacrylate, glycidyl acrylate, glycidyl methacrylate, maleic acid monoethyl ester, maleic acid diethyl ester, fumaric acid monomethyl ester, fumaric acid diethyl ester, itaconic acid monomethyl ester, itaconic acid diethyl ester, acrylamide, methacrylamide, maleic acid monoamide, maleic acid diamine, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N,N-diethylamide, fumaric acid N-monobutylamide, fumaric acid N,N-dibutylamide, maleimide, N-butylmaleimide, N-phenylmaleimide, sodium acrylate, sodium methacrylate, potassium acrylate, potassium methacrylate, etc. Preferably, the graft-modified derivative is one prepared by graft-modifying a polyolefinic resin or a functional group-having polyolefinic resin with the grafting monomer in a ratio of generally from 0.005 to 10% by weight, preferably from 0.01 to 5% by weight relative to the resin.

One alone or two or more different types may be selected from the above-mentioned thermoplastic resins either singly or as combined, for the thermoplastic resin for the substrate layer (A). Of those polyolefinic resins and functional group-having polyolefinic resins, more preferred are propylenic resins from the viewpoint of the chemical resistance and the cost thereof. As the propylenic resin, preferred for use herein is one that comprises, as the main ingredient thereof, a propylene homopolymer of polypropylene having a different stereoregularity of isotacticity, syndiotacticity or the like, or a propylene-based copolymer prepared through copolymerization with an α-olefin such as ethylene, 1-butene, 1-hexene, 1-heptene, 4-methyl-1-pentene or the like. The copolymer may be a secondary one or may also be a ternary or more polynary copolymer, and may be a random copolymer or a block copolymer. Preferably, the propylenic resin for use herein is blended with a resin having a lower melting point than that of the propylene homopolymer, in an amount of from 2 to 25% by weight. Examples of the resin having such a low melting point include high-density or low-density polyethylene.

If desired, an inorganic fine powder, an organic filler, a thermal stabilizer (antioxidant), a light stabilizer, a dispersant, a lubricant and the like may be added to the substrate layer (A) in addition to the thermoplastic resin therein. In case where an inorganic fine powder is added, usable is one having a mean particle size of generally from 0.01 to 15 μm, preferably from 0.1 to 5 μm. Concretely, usable are calcium carbonate, fired clay, silica, diatomaceous earth, white clay, talc, titanium oxide, barium sulfate, alumina, zeolite, mica, sericite, bentonite, sepiolite, vermiculite, dolomite, wollastonite, glass fibers, etc.

In case where an organic filler is added, preferably, a resin different from the thermoplastic resin that is the main ingredient of the layer is selected for it. For example, in case where the thermoplastic resin film is a polyolefinic resin film, the organic filler may be a polymer such as polyethylene terephthalate, polybutylene terephthalate, polycarbonate, nylon-6, nylon-6,6, cyclic polyolefin, polystyrene, polymethacrylate or the like, which has a melting point higher than the melting point of the polyolefinic resin (for example, from 170 to 300° C.) or a glass transition temperature higher than the latter (for example, 170 to 280° C.) and which is immiscible with the polyolefinic resin.

In case where a thermal stabilizer is added, in general, it is added in an amount falling within a range of from 0.001 to 1% by weight. Concretely, sterically-hindered phenol-type, phosphorus-containing or amine-type stabilizers may be used. In case where a light stabilizer is used, in general, it is added in an amount falling within a range of from 0.001 to 1% by weight. Concretely, sterically-hindered amines, or benzotriazole-type or benzophenone-type light stabilizers may be used. A dispersant and a lubricant are added for the purpose of dispersing the inorganic fine powder. Its amount to be added may be generally within a range of from 0.01 to 4% by weight. Concretely, there may be used silane coupling agents, higher fatty acids such as oleic acid, stearic acid or the like, as well as metal soap, polyacrylic acid, polymethacrylic acid or their salts.

The thickness of the substrate layer (A) is generally within a range of from 30 to 500 μm, preferably from 70 to 300 μm. When the thickness of the layer is at least 30 μm, then the film may hardly wrinkle when stuck to an adherend as a water-absorbable and readily-removable film such as wallpaper or the like and, and may be therefore stuck thereto beautifully. In addition, when the thickness is at least 30 μm, then the film could have a sufficient toughness when stuck to a resin molded article, for example, as an in-mold molding label, and therefore may hardly wrinkle and may be stuck to the molded article also beautifully. When peeled, the film may tend to be hardly broken. On the other hand, when the thickness of the layer is at most 500 μm, then the film could have suitable toughness and stiffness and can be readily processed and printed, and in addition, when the film is used, for example, as an in-mold molding label, the label could be well held in the mold.

[Multi-Stratification]

The substrate layer (A) may have a single-layer configuration, or may have a multilayer configuration of two or more layers. Multi-stratification of the substrate layer (A) makes it possible to impart various functions such as writability, printability, abrasion resistance, secondary processability and the like, to the layer.

In case where the substrate (A) is made to have a multilayer configuration, preferably, the content of at least one of the inorganic fine powder and the organic filler in the layer (A1) that is in contact with the readily removable layer (B) to be mentioned below is smaller by at least 5% by weight, preferably by at least 10% by weight than that in the readily removable layer (B). When the content of at least one of the inorganic fine powder and the organic filler in the layer (A1) is smaller by at least 5% by weight than that in the readily removable layer (B), then there occurs a difference in the porosity between the readily removable layer (B) and the layer (A1), and therefore, when the readily removable film is removed from the adherend to which it has been stuck, only the readily removable layer (B) could undergo rupture propagation. Concretely, the layer (A1) contains from 35 to 100% by weight, preferably from 40 to 100% by weight of a thermoplastic resin, and from 0 to 65% by weight, preferably from 0 to 60% by weight of at least one of an inorganic fine powder and an organic filler.

The mode of stretching of the multilayer configuration of, for example, a two-layer configuration of surface layer/(A1) layer includes, for example, unstretched/monoaxial, unstretched/biaxial, monoaxial/monoaxial, monoaxial/biaxial, biaxial/monoaxial, or biaxial/biaxial.

[Readily Removable Layer (B)]

The readily removable layer (B) in the invention is formed on the substrate layer (A). The readily removable film of the invention is removed through rupture (cohesion failure) of the readily removable layer (B). In the invention, for smooth rupture of the layer (B), at least two different types of resins that are immiscible with each other are blended as the resin material, and the layer is stretched in a phase-separated state, whereby peeling occurs not only in the interface of the above-mentioned pores but also in the interface of these resins and the layer (B) can be thereby peeled as a uniform layer.

In the invention, the readily removable layer (B) can absorb liquid. In particular, in case where an inorganic fine powder of particles hydrophilized with a surface-treating agent on the surface thereof is incorporated in the layer, the liquid absorbability of the layer is high. This is because, when the layer (B) is stretched, a large number of surface pores and internal pores are formed starting from the nuclei of the particles. Consequently, especially because a water-based adhesive is applicable to the readily removable film of the invention and because the film can be stuck to an adherend via the adhesive, the film can be used as a water-absorbing readily removable film such as wallpaper, etc. In addition, since the layer (B) is more brittle than the layer (A) and its strength is smaller than that of the latter, the film can be readily peeled in the state thereof not containing the adhesive owing to the fracture of the layer (B). Further, since the layer (B) can be peeled as a more uniform layer, as compared with any conventional known water-absorbing layer, any crude irregularities resulting from the layer (B) are not left on the surface of the adherend, and even when any other film is again stuck to the adherend, it does not detract from the appearance of the film-stuck adherend at all.

The readily removable film of the invention is a porous resin film having pores in the surface thereof, and therefore, for example, when the film is used as an in-mold molding label, the molten resin could penetrate into the pores in the surface of the readily removable layer (B) owing to the resin pressure during the step of in-mold molding to give a resin molded article, whereby the label can be stuck to the resin molded article owing to the anchoring effect of the penetrated resin. Accordingly, the label can be stuck to any resin molded articles irrespective of the material of the resin molded articles. Further, the readily removable layer (B) is more brittle than the layer (A) and its strength is smaller than that of the latter, the label can be readily removed from the labeled resin molded article owing to the fracture of the layer (B). In addition, the readily removable layer (B) has a large number of open pores communicating with each other in the inside thereof, and therefore, when the label is stuck to a resin molded article and even when air remains between the label and the resin molded article in that case, the air could be expelled out by the resin via the open pores and does not remain between the two to swell the label. Further, the surface of the readily removable layer (B) is flat and smooth, and contains an inorganic fine powder of particles preferably hydrophilized on the surface thereof, and therefore its printability is good. Printing on the surface of the layer does not interfere with the adhesiveness and the peeling strength of the label.

[Blend Ratio]

The readily removable layer (B) in the invention contains from 30 to 60% by weight, preferably from 35 to 50% by weight of a mixture of a crystalline polypropylene resin and a thermoplastic resin immiscible with the crystalline polypropylene resin, and from 40 to 70% by weight, preferably from 50 to 65% by weight of a fine powder, and the readily peelable layer (B) is stretched at least monoaxially. When the content of the fine powder in the readily removable layer (B) is less than 40% by weight, then the layer could not secure sufficient removability. On the contrary, when the content is more than 70% by weight, then the layer would lose shape stability.

In the mixture, the thermoplastic resin immiscible with the crystalline polypropylene resin is blended in a ratio of from 105 to 300 parts by weight, preferably from 120 to 280 parts by weight, more preferably from 140 to 270 parts by weight relative to 100 parts by weight of the crystalline polypropylene resin.

[Crystalline Polypropylene Resin]

The crystalline polypropylene resin is the above-mentioned propylenic resin having a degree of crystallinity of at least 65%, preferably at least 66%, more preferably from 67 to 80%. When the crystalline polypropylene resin has a degree of crystallinity of at least 65%, then the amorphous part of the resin is hardly miscible with thermoplastic resin therefore readily securing the intended effect of interfacial peeling and the stress necessary for peeling (peeling strength) can be suitably reduced. On the other hand, when the degree of crystallinity is at most 80%, then the resin of the type is readily available on the market.

In the invention, the degree of crystallinity of the crystalline polypropylene resin is determined as follows: A sample of the resin is annealed in an oven set at 105° C. for 90 minutes, and then under the condition at a temperature of 23° C., the density of the crystalline polypropylene resin is measured according to a density gradient tube method or a method of collecting gas over water (the two methods are mutually correctable according to a conversion formula), and from the density of the resin, the degree of crystallinity thereof is computed according to the following formula (1).

[Math. 1]

$$\text{Degree of Crystallinity (\% by weight)} = \frac{\rho C \times (\rho S - \rho A)}{\rho S \times (\rho C - \rho A)} \times 100 \quad (1)$$

(In the above-formula (1), $\rho S$ means the density of the crystalline polypropylene, $\rho C$ means the theoretical density of the crystal part of the polypropylene resin (0.938 g/cm$^3$), $\rho A$ means the theoretical density of the amorphous part of the polypropylene resin (0.852 g/cm$^3$).)

Accordingly, for attaining the above-mentioned degree of crystallinity, it is desirable that the density of the crystalline polypropylene resin to be used in the readily removable layer (B) is at least 0.906 g/cm$^3$, more preferably at least 0.907 g/cm$^3$, even more preferably at least 0.908 g/cm$^3$.

[Thermoplastic Resin Immiscible with Crystalline Polypropylene Resin]

The thermoplastic resin immiscible with the crystalline polypropylene resin includes polyethylene resin, styrenic resin, cyclic polyolefin resin, ethylene/cyclic olefin copolymer resin; polyamide resin such as nylon-6, nylon-6,6, nylon-6,10, nylon 6.12, etc.; thermoplastic polyester resin such as polyethylene terephthalate and its copolymer, polyethylene naphthalate, polybutylene terephthalate, polybutylene succinate, polylactic acid, aliphatic polyester, etc.; polycarbonate, etc. Two or more of these may be used here as combined. Of those, more preferred is polyethylene resin from the viewpoint of the chemical resistance and the production cost thereof, etc. The presence of the immiscible thermoplastic resin provides interfacial peeling between the crystalline polypropylene resin and the thermoplastic resin immiscible with the polypropylene resin during production of stretched films, thereby enhancing the peelability of the films. When the immiscible thermoplastic resin is blended with the polypropylene resin in an amount of less than 105 parts by weight or in an amount of more than 300 parts by weight, then sufficient peelability could not be attained.

In the invention, "immiscible" means that, when a mixture of the crystalline polypropylene resin and the immiscible thermoplastic resin is inspected with an electronic microscope, it gives a sea-island structure morphology and the dimension of the structure is from 0.3 to 10 μm.

[Fine Powder]

As the fine powder, herein usable are a hydrophilized inorganic fine powder, a non-hydrophilized inorganic fine powder and an organic fine powder. The fine powder may be a hydrophilized inorganic fine powder alone, or may be a non-hydrophilized inorganic fine powder or an organic fine powder alone, or may also be a hydrophilized inorganic fine powder, and a non-hydrophilized inorganic fine powder and/or an organic fine powder as combined.

Examples of the inorganic fine powder include a fine inorganic powder of heavy calcium carbonate, light calcium carbonate, fired clay, talc, titanium oxide, barium sulfate, zinc oxide, magnesium oxide, diatomaceous earth, silicon oxide or the like; a composite inorganic fine powder having an aluminium oxide or hydroxide around the nuclei of the inorganic fine powder; hollow glass beads, etc. Above all, preferred are heavy calcium carbonate, fired clay and diatomaceous earth as they are inexpensive and can form a large number of pores in stretching.

As the organic fine powder, preferably selected here is a resin that differs from the polypropylene resin used in the readily removable layer (B). For example, usable here are polymers such as polyethylene terephthalate, polybutylene terephthalate, polycarbonate, nylon-6, nylon-6,6, cyclic polyolefin, polystyrene, polymethacrylate and the like having a melting point (for example, 170 to 300° C.) or a glass transition temperature (for example, 170 to 280° C.) higher than the melting point of the polypropylene resin and immiscible with the polypropylene resin.

As the inorganic powder in the invention, preferred is use of at least the above-exemplified inorganic fine powder of particles hydrophilized with a surface-treating agent on the surface thereof.

When the surface-hydrophilized inorganic fine powder is used to form the readily removable layer (B), the printability of the surface of the readily removable layer (B) is bettered and beautiful films and labels can be provided here. In particular, in case where the film of the invention is used as an in-mold molding label, beautiful labeled molded articles can be obtained and, in addition, the readily removable layer (B) comprising the powder of the type can more readily undergo interfacial peeling between the inorganic fine powder and the crystalline polypropylene, and therefore the label can be more readily removed from the molded article.

The surface-treating agent includes a water-soluble anionic surfactant, a water-soluble cationic surfactant, and a water-soluble nonionic surfactant.

Specific examples of the surfactants are mentioned. For example, the water-soluble anionic surfactant includes sulfonate salts having a hydrocarbon group with from 4 to 40 carbon atoms, phosphate ester salts having a hydrocarbon group with from 4 to 40 carbon atoms, salts of phosphoric mono or diesters with higher alcohol having from 4 to 40 carbon atoms, alkylbetaines and alkylsulfobetaines having a hydrocarbon group with from 4 to 40 carbon atoms, etc. For example, the water-soluble cationic surfactant includes diallylamine salts, alkyldiallylamine salts and dialkyldiallylamine salts having from 1 to 4 carbon atoms, or that is, methyldiallylamine salts, ethyldiallylamine salts, dimethyldiallylamine salts, methacryloyloxyethyltrimethylammonium, acryloyloxyethyltrimethylammonium, methacryloyloxyethyldimethylethylammonium or acryloyloxyethyldimethylammonium chloride, bromide, methosulfate or ethosulfate; quaternary ammonium salts prepared by alkylating N,N-dimethylaminomethyl methacrylate of N,N-dimethylaminoethyl acrylate with an epoxy compound such as epichlorohydrin, glycidol, glycidyl trimethylammonium chloride, etc. Of those, preferred are diallylamine salts, methyldiallylamine salts and dimethyldiallylamine salts. For example, the water-soluble nonionic surfactant includes acrylamide, methacrylamide, N-vinyformamide, N-vinyl acetamide, N-vinylpyrrolidone, 2-hydroxyethyl methacrylate, 2-hydroxyethyl acrylate, 2-hydroxy(meth)acrylate 3-hydroxypropyl(meth)acrylate, methyl(meth)acrylate, ethyl(meth)acrylate, butyl(meth)acrylate, etc. Of those, preferred are acrylamide and methacrylamide.

Preferably, the surface-treating agent for use herein has a mean molecular weight of from 1,000 to 15,000.

As the surface treatment method for the inorganic fine powder, for example, there is mentioned a method of wet-grinding coarse particles of calcium carbonate having a particle size of from 10 to 50 µm in an aqueous medium in the presence of a necessary amount of a surface-treating agent relative to 100 parts by weight of the coarse particles, thereby making the particles have a desired particle size. Concretely, water is added to calcium carbonate in such a manner that the ratio by weight of calcium carbonate/aqueous medium (concretely water) could be from 70/30 to 30/70, preferably from 60/40 to 40/60, and a surface-treating agent is added thereto in an amount of from 0.01 to 10 parts by weight, preferably from 0.1 to 5 parts by weight relative to 100 parts by weight of calcium carbonate, and these are wet-ground according to an ordinary method. Apart from this, an aqueous medium may be prepared, in which a surface-treating agent of the amount as above has been previously dissolved, and the aqueous medium may be mixed with calcium carbonate, and then wet-ground according to an ordinary method. Wet grinding may be attained in a batch mode or in a continuous mode, for which a mill with a grinder such as a sand mill, an attritor, a ball mill or the like may be used.

Specific examples of the inorganic fine powder of particles surface-treated with the surface-treating agent include, for example, Fimatec's trade name "AFF", etc.

Preferably, in addition to the above-mentioned inorganic fine powder of surface-hydrophilized particles and as combined therewith, an inorganic fine powder of particles not hydrophilized on the surface thereof or an organic fine powder may be added to the readily removable layer (B) in the invention. The blend ratio of the ingredients is preferably such that the inorganic fine powder of surface-hydrophilized particles accounts for from 50 to 99.9% by weight, and at least one of the inorganic fine powder of particles not hydrophilized on the surface thereof and the organic fine powder accounts for from 0.1 to 50% by weight relative to 100% by weight of the fine powder; and more preferably, the inorganic fine powder of surface-hydrophilized particles accounts for from 55 to 80% by weight, and at least one of the inorganic fine powder of particles not hydrophilized on the surface thereof and the organic fine powder accounts for from 20 to 45% by weight. Preferably, the content of the inorganic fine powder of particles not hydrophilized on the surface thereof and the organic fine powder in the readily removable layer (B) is from 0.1 to 30% by weight.

The "inorganic fine powder of particles not hydrophilized on the surface thereof" is meant to indicate an inorganic fine powder not intentionally hydrophilized with the above-mentioned surface-treating agent, and is meant to indicate an inorganic fine powder prepared through an ordinary process of grinding, classification, precipitation, etc. For example, when a hydrophilized calcium carbonate fine powder is mixed with an ordinary heavy calcium carbonate fine powder, then the amount of the substance to be released from the readily removable layer (B) can be controlled; and for example, when a hydrophilized calcium carbonate fine powder is mixed with an organic fine powder, then the water absorbability of the layer can be controlled. Even when different types of fine powders are combined in that manner, but in case where the total amount of the fine powders to be contained in the readily removable layer (B) is more than 70% by weight, the stretching formability of the readily removable film may worsen and the film may lose the shape stability thereof, and therefore, the case is unfavorable.

[Dispersant]

Preferably, the readily removable layer (B) in the invention contains a dispersant for uniformly and finely dispersing the inorganic fine powder therein.

As examples of the dispersant for the inorganic fine powder, for example, there may be mentioned acid-modified polyolefins, silanol-modified polyolefins, etc. In the invention, especially preferred is use of a maleic acid-modified polyolefin and a silanol-modified polypropylene.

The acid-modified polyolefins include acid anhydride group-having polyolefins prepared through random copolymerization of graft copolymerization with maleic anhydride; carboxylic acid group-having polyolefins prepared through random copolymerization or graft copolymerization with an unsaturated carboxylic acid such as methacrylic acid, acrylic acid or the like; epoxy group-having polyolefins prepared through random copolymerization or graft copolymerization with glycidyl methacrylate, etc. As specific examples, there are mentioned maleic anhydride-modified polypropylene, maleic anhydride-modified polyethylene, acrylic acid-modified polypropylene, ethylene/methacrylic acid random copolymer, ethylene/glycidyl methacrylate random copolymer, ethylene/glycidyl methacrylate graft copolymer, glycidyl methacrylate-modified polypropylene, etc. Above all, especially preferred are maleic anhydride-modified polypropylene and maleic anhydride-modified polyethylene.

Specific examples of maleic anhydride-modified polypropylene and maleic anhydride-modified polyethylene include Mitsubishi Chemical's Modic AP, trade name "P513V", trade name "M513" and trade name "P928"; Sanyo Chemical's trade name "Timex 1001", trade name "Timex 1010" and trade name "Timex 2000"; Mitsui DuPont Chemical's HPR, trade name "VR101".

The degree of acid modification of the acid-modified polyolefin is preferably from 0.01 to 20%, more preferably from 0.05 to 15%. When the degree of acid modification is at least 0.01%, then the dispersing effect of the inorganic fine powder in the resin mixture can be fully attained. When the degree of acid modification is at most 20%, then the softening point of the acid-modified polyolefin is not lowered so much and therefore it is relatively easy to compound the polyolefin and the thermoplastic resin.

The content of the dispersant, if any, in the readily removable layer (B) is generally from 0.5 to 30 parts by weight but preferably from 1 to 20 parts by weight relative to 100 parts by weight of the inorganic fine powder therein. When the content of the dispersant is at least 0.5 parts by weight, then the inorganic fine powder can be fully dispersed so that the film can readily obtain the desired surface aperture ratio and the liquid absorption capacity of the film can be readily increased. On the other hand, when the content is at most 30 parts by weight, the stretchability of the film is good and the film can be prevented from being broken during forming it.

[Thickness of Readily Removable Layer (B)]

Preferably, the thickness of the readily removable layer (B) is from 0.1 to 30 µm. The more preferred range of the thickness varies depending on the use of the readily removable film of the invention.

For example, when the readily removable film of the invention is used as a water-absorbing readily removable film of wallpaper or the like, the thickness of the readily removable layer (B) is more preferably from 1 to 30 µm, even more preferably from 1.5 to 15 µm. When the thickness is at least 1 µm, then the film can secure sufficient removability and liquid absorption capacity. On the other hand, even when the thickness is more than 30 µm, there may occur no problem in point of the peeling strength of the film in removing it; however, when the thickness is at most 30 µm, the peeling position may be stabilized and the peeled surface may be more uniform. Accordingly, when a water-absorbing readily removable film such as wallpaper or the like is again stuck to the peeled adherend, irregularities of the peeled surface of the adherend may hardly stand out.

On the other hand, in case where the readily removable film is used as an in-mold molding label, the thickness of the readily removable layer (B) is more preferably from 0.1 to 20 µm, even more preferably from 3 to 18 µm, still more preferably from 6 to 15 µm, further more preferably from 7 to 12 µm. When the thickness of the layer (B) is too thin, then a melt of the resin that constitutes molded articles may penetrate into the vicinity of the substrate layer (A) via the readily removable layer (B), and as a result, though the adhesion strength of the film could increase, but it would be difficult to stably attain cohesion failure inside the readily removable layer (B) when the label is desired to be removed from the labeled resin molded article, and accordingly, it would be difficult to remove the label. On the other hand, when the thickness of the layer (B) is too thick, then there may occur no problem in point of the peeling strength in peeling the film, but the peeling position of the film is unstable and the peeling surface could not be uniform, and as a result, the strain necessary for peeling could not be stabilized and, in addition, irregularities may remain on the surfaces of both the resin molded article and the peeled film, or that is, even when the film is printed on the side of the readily removable layer (B), the print could not be clearly seen.

The readily removable layer (B) is a stretched resin film layer that has been stretched at least monoaxially. As formed by stretching, surface pores and inner pores can be formed in the layer (B), and the layer can be uniformly peeled owing to orientation of the film therein. Further, the readily removable layer (B) can have a uniform thickness.

[Surface Aperture Ratio of Readily Removable Layer (B)]

Preferably, the surface aperture ratio of the readily removable layer (B) is at least 7%, more preferably from 7 to 60%, even more preferably from 12 to 50%, still more preferably from 15 to 40%. When the surface aperture ratio is at least 7%, then the layer can secure sufficient liquid absorbability and adhesiveness. When the surface aperture ratio is at most 60%, then the readily removable layer (B) hardly breaks in forming by stretching as mentioned below, and the intended laminate resin film can be stably formed.

"Surface aperture ratio" as referred to in the invention means the proportion of the area which the pores occupy in the observed region in electronic microscopy of the surface on the readily removable layer (B) of the film. Concretely, any desired part is cut out of the laminate resin film sample, stuck to a test sample stand, and gold or gold-palladium is vapor-deposited on the surface thereof to be observed, and using an electronic microscope (for example, Hitachi's scanning microscope, S-2400), the pores in the surface of the test piece are observed at a desired observation magnification (for example, as enlarged at from 500-power to 3000-power magnification). The observed region is taken as a photographic picture or the like, then the pores therein are traced on a tracing film, and the resulting image is processed with an image analyzer (Nireco's Luzex IID Model), and the ratio of the pore area is referred to as the surface aperture ratio of the readily removable layer (B).

[Porosity of Readily Removable Layer (B)]

Preferably, the porosity of the readily removable layer (B) is from 20 to 60%, more preferably from 30 to 55%, even more preferably from 35 to 50%. When the porosity is at least 20%, then the film can secure sufficient adhesiveness. When the porosity is at most 60%, then the readily removable layer (B) would hardly broke in forming it by stretching described later, and a laminate resin film can be stably formed.

The "porosity" in the invention is determined as follows: A picture of the cross section of the readily removable layer (B) is taken via an electronic microscope, and the areal ratio (%) of the pores to the region of the cross section in the picture is determined and referred to as the porosity. Concretely, the laminate resin film is buried in an epoxy resin and solidified, and then, using a microtome, the film is cut in the direction parallel to the thickness direction thereof (or that is, in the direction vertical to the surface direction) to give a cut section, and the cut section is metalized through vapor deposition, and thereafter using the above-mentioned electronic microscope at a desired observation magnification (for example, at 500-power to 3000-power magnification), the cross section is observed. The pore parts in the enlarged image are traced on a tracing film, and the resulting image is processed with the above-mentioned image analyzer to thereby determine the areal ratio (%) of the pores that occupy the measurement range. Thus determined, the areal ratio is referred to as the porosity (%).

[Arithmetic Mean Roughness of Surface of Readily Removable Layer (B)]

The arithmetic mean roughness Ra of the surface of the readily removable layer (B) is preferably from 0.3 to 1.8 μm, more preferably from 0.5 to 1.6 μm, even more preferably from 0.7 to 1.4 μm. When the arithmetic mean roughness is at least 0.3 μm, then the layer secures the anchoring effect of the molding resin to penetrate into the irregularities of the surface of the readily removable layer owing to the resin pressure in molding, thereby contributing toward enhancing the adhesion power of the layer. When the arithmetic mean roughness is at most 1.8 μm, then there may not occur dot failure owing to the irregularities of the surface of the layer in printing thereon to cause image quality degradation.

In the invention, "arithmetic mean roughness" is determined by the use of a surface roughness meter (Kosaka Laboratory's trade name Surf corder SE30) based on the regulations in JIS-B0601.

[Production of Laminate Resin Film]

Preferably, the substrate layer (A) and the readily removable layer (B) are, after laminated, stretched at least monoaxially. The readily removable layer (B) in the invention has a low strength and is thin, and therefore the readily removable layer (B) is extremely difficult to stretch and form as a single layer thereof by itself. By stretching the substrate layer (A) and the readily removable layer (B) after laminated, the readily removable layer (B) comes to be readily stretched. Accordingly, the substrate layer (A) can also serve as a carrier body in stretching the readily removable layer (B) thereon.

For the lamination, various known methods are employable. Concrete cases include a multilayer die system using multiple extruders, a feed block, a multi-manifold and a multilayer die, and an extrusion lamination system using multiple extruders and dies. The multilayer die system and the extrusion lamination system may be combined for use herein.

For stretching the film, various known methods are employable. The stretching temperature may fall within a known temperature range of from the glass transition temperature of the thermoplastic resin mainly used for the substrate layer (A) up to the melting point of the crystal part of the resin and favorable for the thermoplastic resin. Concretely, in case where the thermoplastic resin of the substrate layer (A) is a propylene homopolymer (melting point, 155 to 167° C.), the stretching temperature may be from 100 to 166° C. and where the resin is a high-density polyethylene (melting point, 121 to 136° C.), the stretching temperature may be from 70 to 135° C., or that is, the stretching temperature is lower by 1 to 70° C. than the melting point of the thermoplastic resin. Concrete methods for stretching include roll-to-roll stretching that uses the peripheral speed difference between the rolls used, and clip stretching that uses a tenter oven. According to roll-to-roll stretching, the low-melting-point resin contained in the outermost layer may adhere to the rolls used, and therefore, the film is preferably stretched according to tenter stretching.

Not specifically defined, the draw ratio in stretching may be defined in consideration of the intended use of the readily removable film of the invention and of the characteristics of the resin to be used. In case where the film is stretched monoaxially, the draw ratio may be generally from 2 to 11 times, preferably from 3 to 10 times. More preferably, the draw ratio is from 4 to 7 times. When the film is clip-stretched by the use of a tenter oven, the draw ratio is preferably from 4 to 11 times. In case where the film is stretched biaxially, the areal draw ratio may be generally from 2 to 80 times but preferably from 3 to 60 times, more preferably from 4 to 50 times. When the areal draw ratio is at least 2 times, then the film surface could readily have the desired aperture ratio and could readily secure sufficient adhesiveness. When the ratio is at most 80 times, the film may be prevented from being cut or broken to have large holes during stretching.

After stretched, the laminate resin film is preferably heat-treated. The heat treatment temperature is preferably selected from a range falling from the stretching temperature to a temperature higher by 30° C. than the stretching temperature. The heat treatment reduces the thermal shrinkage of the film in the stretching direction, prevents the film roll from being tightened during storage, and prevents the film from being shrunk and waved during in-mold molding. Regarding the heat treatment method, in general, the film is heated with rolls or in a hot oven, and the two may be combined. More preferably, the stretched film is heat-treated under tension, as capable of enjoying higher heat treatment effect.

After the heat treatment, the surface of the laminate resin film is preferably processed for oxidation treatment such as corona discharge treatment, plasma treatment, etc. The oxidation treatment enhances the surface wettability therefore providing an advantage of enhanced ink acceptability in printing.

In case where the readily removable film of the invention is used as a water-absorbing readily removable film such as wallpaper or the like, preferably, the surface thereof is processed for oxidation treatment such as corona discharge treatment, plasma treatment or the like, as enhancing the surface wettability; and in case where a water-based adhesive layer is provided on the film, the surface treatment is more advantageous in that the solvent absorption rate for the water-based adhesive increases and the adhesive component can penetrate more rapidly and in a larger amount through the open pores in the surface of the readily removable layer (B). Further, another advantage is that the adhesiveness between the readily removable layer (B) and the water-based adhesive is enhanced.

The liquid absorption capacity of the thus-produced readily removable layer (B) is preferably from 1 to 20 ml/m$^2$. This may be controlled by controlling inner porosity of the readily removable layer (B) that is influenced by the amount of the surface-treated inorganic fine powder to be added and the draw ratio in stretching, and also by controlling the thickness of the readily removable layer (B). In case where the liquid absorption capacity is less than 1 ml/m$^2$, then the adhesive could not dry when the readily removable film is stuck to an adherend via an adhesive, and as a result, the film could not exhibit the desired performance thereof, which is intended by the invention. In this description, "liquid absorption capacity" is determined by a Bristow liquid absorption test according to JAPAN TAPPI No. 51:2000. Briefly, using Kumagai Riki Kogyo's Bristow tester Model II, 20 μl of a mixture prepared by mixing ion-exchanged water and red aqueous ink in a ratio of 20/1 is dropwise added to the sample under no pressure given thereto, and the liquid transfer amount for 50 ms is measured.

[Masking Layer (C)]

The readily removable film of the invention may be made nontransparent in order that the underlying base could not be seen through it. For making the readily removable film nontransparent, preferably, a masking layer (C) is provided. Specific examples of the masking layer (C) include colorful printing such as black printing or gray printing on the surface of the readily removable layer (B). This may be readily applied to the readily removable film, but is preferably so attained as not detract from application of an adhesive to the film to be mentioned below.

Another example of the masking layer (C) includes increasing the degree of opacity of the base layer (A). For example, there may be mentioned a method of adding to the material of the substrate layer (A), a pigment having strong masking capability, such as titanium oxide powder, aluminium powder, carbon black or the like, to thereby increase the degree of opacity of the layer, and a method of making the substrate layer (A) have a multilayer structure with a black print interlayer inserted thereinto. The method of black print interlayer insertion may be attained by previously black-printing on one or both surfaces of the layer constituting the multilayer structure followed by laminating the constitutive layers through dry lamination using an adhesive to sandwich the black print layer between the other constitutive layers.

[Printing]

In the readily removable film of the invention, multi-stratification of the substrate layer (A) makes it possible to impart various functions such as writability, printability, abrasion resistance, secondary processability and the like, to the film. In particular, since the film of the invention can be used as wallpapers or labels for resin containers and others, the printability thereof is especially needed. For imparting printability to the readily removable film, employable is any known conventional method such as lamination with a coat layer. For the printing, employable is any method of gravure printing, offset printing, flexographic printing, screen printing, inkjet printing, electrophotographic printing or the like; and various designs and informations such as images, barcodes, manufacturer names, sales company names, characters, product names, how-to-use methods and others may be given to the label.

In addition, the readily removable film of the invention has good printability also on the surface on the readily removable layer (B). This is, as mentioned above, because the surface of the readily removable layer (B) is flat and smooth and contains an inorganic fine powder of particles preferably hydrophilized on the surface thereof. The surface of the layer has few irregularities and therefore its dot gain (dot thickening) is small, and consequently high-precision printing is possible on the surface. In addition, since the layer contains an inorganic fine powder of particles preferably hydrophilized on the surface thereof, the wettability (compatibility) thereof with ink is enhanced and therefore the layer enjoys excellent ink transferability thereonto as combined with the capillary phenomenon of the open pores in the surface thereof.

In case where the readily removable film of the invention is used as a water-absorbing readily removable film such as wallpaper or the like, preferably, the film is used as a wound-up (roll) form of a long film. The printing mode for the film of the type is preferably gravure printing, flexographic printing or plotter-assisted inkjet printing of the above-mentioned printing modes. In case where the readily removable film is used as a label, preferably, higher-definition printing is applicable thereto. The printing mode for the film of the type is preferably offset printing. In case where the readily removable film is printed according to an inkjet printing method or the like, preferably, a coat layer (D) for fixing the coloring matter on the surface on the side of the substrate layer (A) to be the printing surface of the film is provided in accordance with the printing method. The preferred coat layer (D) is one especially applicable to inkjet printing including water-based inkjet, solvent-based inkjet, UV inkjet, latex inkjet or the like. Concretely, for water-based inkjet printing, preferred is a coat layer (D) of polyvinyl alcohol or the like with silica added thereto; and for UV inkjet printing, preferred is a coat layer (D) of polyurethane or the like with silica added thereto.

When the surface on the side of the readily removable layer (B) of the readily removable film of the invention is printed and the film is used, for example, as a label and when the substrate layer (A) is nontransparent in such a case, then the informations including images, letters, QR codes or other barcodes and the like below the readily removable layer (B) can be recognized on the resin molded article or on the label when the substrate layer (A) is peeled off. Accordingly, not only by printing on the surface on the side of the substrate layer (A) on which the contents and other details of the labeled resin molded article can be written but also by printing on the surface on the side of the readily removable layer (B), labeled resin molded containers can be prevented from forgery and undesirable reuse, and the removed labels can be used as a coupon ticket and the like as secondary use, and in that manner, various functions may be given to the film of the invention. The printing on the readily removable layer (B) may be any one including those with four color inks for ordinary process, or with special inks or metallic inks and others that are visually recognizable, as well as those with fluorescent inks and the like that can become visually recognizable through light emission only when black light is applied thereto. The latter could be more excellent for forgery prevention.

[Use as Water-Absorbing Readily Removable Film]

A case of using the readily removable film of the invention as a water-absorbing readily removable film such as wallpaper or the like is described. An adhesive may be directly applied to the back side, or that is, the side of the readily removable layer (B) of the readily removable film of the invention, and the film may be directly stuck to an adherend of woody wall materials, gypsum boards, various composite materials (resin decorative plates, woody plywood plates, etc.), iron plates, aluminium plates, glass, ceramics, resins, etc. Accordingly, in case where the readily removable film of the invention is used as wallpapers, labels and others, lining on the back side of the film with a lining material (natural paper, etc.) is unnecessary. Consequently, in case where the readily removable film of the invention, which has been formed into wallpapers, labels and the like, is removed from the adherend for recycling it, the recycling materials are not contaminated with a lining material (natural paper, etc.), and in addition, since the film is removed as a uniform flay layer, the adhesive can all remain on the side of the adherend but not at all on the side of the film, therefore enabling material recycling.

The adhesive for use for sticking the readily removable film of the invention is not specifically defined, for which is employable any of protein-based adhesives, carbohydrate-based adhesives, synthetic resin-based adhesives, solvent-based adhesives, etc. In this, adhesives using water as the medium, such as protein-based adhesives, carbohydrate-based adhesives and synthetic resin-based adhesives are collectively referred to as water-based adhesives. The adhesive for use herein may be any of water-based or solvent-based ones, but from the viewpoint of operability and safety (with no risk of oxidation and fire owing to solvent scattering), preferred is use of water-based adhesives.

Water-based adhesives are characterized in that they dissolve or swell in water. For example, protein-based adhesives include gelatin, glue, casein, etc. Carbohydrate-based adhesives include starch and its derivatives, cellulose derivatives such as hydroxyethyl cellulose, ethylhydroxyethyl cellulose, carboxymethyl cellulose (CMC), viscose, etc. In addition, also mentioned are gum arabic, tragacanth gum, etc.

Synthetic resin-based adhesives include polyvinyl alcohol, polyvinyl ether, polyvinyl pyrrolidone, etc. In addition, also mentioned are polyacrylamide, polyethylene oxide, polyvinylamide, water-soluble polyurethane, polyacrylic acid-based resins and their salts, etc. Further mentioned are adhesives that uses an emulsion prepared through emulsion polymerization of vinyl acetate, acrylate, ethylene and vinyl acetate, vinyl chloride, etc.

Above all, as the water-based adhesive to be used for sticking the readily removable film of the invention to an adherend, preferred are starch and its derivatives, polyacrylic acid, polyacrylamide, polyethylene oxide, polyvinyl alcohol, carboxymethyl cellulose (CMC), polyvinyl acetate and polyvinylamide, from the viewpoint of the workability and the adhesiveness thereof; and more preferred are starch and its derivatives.

In case where the readily removable film of the invention is used as a water-absorbing readily removable film such as wallpaper or the like, preferably, the peeling strength of the readily removable layer (B) falls within a range of from 50 to 180 gf/18 mm, and preferably, the readily removable layer (B) is peelable as a uniform flat layer through cohesion failure therein. The peeling strength indicates the strength needed in peeling the film stuck to an adherend. In this case, the peeling itself goes on through rupture in the part of the readily removable layer (B) into which no adhesive has penetrated, and therefore in the invention, an adhesive tape is spuriously stuck to the readily removable layer (B) and the strength needed in peeling the tape is measured. Thus measured, the strength is referred to as the peeling strength in the invention.

When the peeling strength is less than 50 gf/18 mm, then the film stuck to an adherend may readily peel off by external shock applied thereto; but when the peeling strength is more than 180 gf/18 mm, then the strength would be more than the strength of the adhesive though depending on the type of the adhesive, or would be more than the surface strength of the adherend to which the film has been stuck, and as a result, the readily removable layer (B) could not undergo cohesion failure inside it. In this description, the "peeling strength" is measured as follows: An adhesive tape (Nichiban's cellophane tape, trade name "Cellotape", brand name "CT-18") is stuck to the side of the readily removable layer (B) of the film, and cut in a length of 100 mm. Using a tensile tester (Shimadzu's trade name "AUTOGRAPH"), the adhesive tape is pulled at a pulling rate of 300 mm/min and at an angle of 180°, thereby causing removal of the adhesive tape from the substrate layer (A) at the readily removable layer (B), whereupon the stress under which the peeling is stable is measured with a load cell. The data in the lateral direction and those in the longitudinal direction are averaged, and the resulting mean value indicates the peeling strength.

After the readily removable film of the invention is peeled off from a wall surface, a bottle or the like, the readily removable layer (B) having water absorbability remains on the wall surface, bottle, etc. In such a case, when a water-based adhesive is directly applied to the readily removable layer (B) of another readily removable film and when the film is stuck onto the remaining readily removable layer (B) on the wall surface, bottle or the like, then the thus-stuck film secures sufficient adhesiveness. In other words, when a new wallpaper or label is applied to the adherend from which the previous wallpaper or label has been removed, it is unnecessary to remove the readily removable layer (B) having remained on the wall surface, bottle or the like, but rather it is possible to again stick a new readily removable film to the adherend from which the former readily removable film has been peeled away, by utilizing the readily removable layer (B) having remained on the wall surface, bottle or the like.

Through the cycle of sticking/peeling of the readily removable film of the invention to and from the adherend such as wall surface, bottle or the like, the adhesive and the readily removable layer (B) remain and accumulate every time; however, since the layer (B) is peeled as a thin and uniform flat layer, it does not provide any uneven irregularities on the adherend and does not worsen the appearance thereof.

[Use as In-Mold Molding Label]

A case of using the readily removable film of the invention as an in-mold molding label is described.

The readily removable film of the invention is favorable for an in-mold label for direct blow molding of such that a molten resin parison is stuck to the inner wall of a mold under pressure, or for stretch blow molding that uses a preform, and in addition, the film is also favorable for an in-mold label for injection molding of such that a molten resin is injected into a mold via an injection unit and cooled and solidified therein.

Further, the film is usable as a label for differential pressure molding in such a manner that the label is arranged so that its printed surface could be in contact with the inner wall surface of the lower female die of a differential pressure molding mold, and the fixed to the inner wall of the mold through suction, and thereafter a molten material for a resin sheet for forming a molded article is introduced to the upper site of the lower female die, and in that condition, the label is integrally fused to the outer wall of the shaped article through differential pressure molding. The differential pressure molding may employ any of vacuum forming or pressure forming, but in general, this employs both the two, or that is, preferred is plug-assisted differential pressure molding.

The resin molded article with the in-mold molding label of the invention integrally attached thereto can be so molded that the label therein and the resin molded article are integrated after fixation of the label in the mold, and therefore, the label does not deform at all, and the shaped article and the label have a suitable adhesion strength therebetween with no blistering. Accordingly, a label-decorated shaped article having good appearance can be obtained.

The in-mold molding label of the invention is applicable to molded articles of various thermoplastic resins falling within a broad range. The thermoplastic resins to which the label is applicable include polypropylene resins, polyethylene resins, polystyrene resins, polyethylene terephthalate resins, etc. One alone or two or more different types of these resins may be used here either singly or as combined.

The labeled resin molded article of the invention is a container to be obtained according to the above-mentioned molding method, and is usable as chemical containers (bottles) for household cleaners, bath cleaners, toilet cleaners, car cleaners, face washes, liquid soaps, shampoos, hair rinses, deodorants, liquid bath salts, ironing starches, germicidal alcohols, glossing waxes, insecticides, etc.; food containers (bottles) for beverages, liquors, soy sauces, oils, mop sauces, seasoning sauces, dressings, etc.; squeeze containers for spreads such as jam, margarine, peanut butter, ketchup, mayonnaise, etc.; containers for ice cream, yoghurt, etc.; containers for wash detergents, dishwashing detergents, wet tissues, etc.

Of the labeled resin molded article of the invention, if desired, the label can be peeled with hand. However, in actual use (during transportation, storefront display, users' use) of the labeled resin molded article, the label has an adhesion strength of such that it does not spontaneously peel off and does not cause any problem. Peeling the label from the labeled resin molded article is characterized in that the substrate layer (A) is peeled through cohesion failure inside the readily removable layer (B). Accordingly, by favorably controlling the cohesion force of the readily removable layer (B) in the labeled resin molded article of the invention, depending on the configuration of the layer such as the blend aspect and the thickness thereof, the label could attain the stress corresponding to the desired peeling.

The peeling strength (stress necessary for peeling) in peeling the substrate layer (A) of the label attached to a resin molded article is preferably within a range of from 40 to 160 gf/15 mm, more preferably within a range of from 100 to 160 gf/15 mm, even more preferably from 120 to 160 gf/15 mm. The peeling strength means the strength necessary for peeling the substrate layer (A) after the film has been stuck to a resin molded article. Preferably, the peeling goes on like a uniform flat layer through cohesion failure inside the readily removable layer (B).

When the peeling strength is at least 40 gf/15 mm, then the label stuck to a resin molded article would hardly peel off by external impact applied thereto. When the peeling strength is at most 160 gf/15 mm, then it is not more than the strength of the adhesive, or not more than the surface strength of the resin molded article to which the label has been stuck, and therefore, the cohesion failure could readily occur inside the readily removable layer (B).

The "peeling strength" in the invention means the stress necessary for peeling the label (substrate layer (A)), and is measured as follows: The label-stuck part of the labeled resin molded article is cut into a piece having a width of 15 mm and a length of 100 mm. Using a tensile tester (Shimadzu's trade name "AUTOGRAPH"), the label is peeled from the molded article via the substrate layer (A) thereof at a pulling rate of 300 mm/min and at an angle of 180°, whereupon the stress under which the peeling is stable is measured with a load cell. The data in the lateral direction and those in the longitudinal direction are averaged, and the resulting mean value indicates the peeling strength.

The peeling strength can be attained by making the crystalline polypropylene to be used in the readily removable layer (B) have a degree of crystallization of at least 65%, or by blending with a predetermined amount of an immiscible thermoplastic resin and an inorganic fine powder, or by stretching the readily removable layer (B) at least monoaxially. Preferably, the peeling strength is controlled by using an inorganic fine powder of surface-hydrophilized particles, or by stretching the film at a temperature lower than the melting point of the crystal part of the crystalline polypropylene, or by selecting the thermoplastic resin having a relatively low viscosity, or by defining the porosity of the readily removable layer (B) to fall within a specific range.

The peeling at the readily removable layer (B) goes on through the rupture of the part of the readily removable layer (B) into which a melt of the resin constituting the molded article has not penetrated, and therefore the peeling strength may be determined as follows: An adhesive tape is stuck to the readily removable layer (B) of the laminate resin film, and the strength needed for peeling the tape is measured. The peeling strength is spuriously derived from the found data, and the true strength of the layer in the laminate resin film is thereby obtained.

The peeling strength in the laminate resin film alone is determined as follows: An adhesive tape (Nichiban's cellophane tape, trade name "Cellotape", brand name "CT-18") is stuck to the readily removable layer (B), and cut into a piece having a length of 100 mm. Using a tensile tester (Shimadzu's trade name "AUTOGRAPH"), the adhesive tape is peeled from the substrate layer (A) via the readily removable layer (B) at a pulling rate of 300 mm/min and at an angle of 180°, whereupon the stress under which the peeling is stable is measured with a load cell. The data in the lateral direction and those in the longitudinal direction are averaged, and the resulting mean value indicates the peeling strength. The peeling strength determined according to the method is preferably from 40 to 200 gf/18 mm, more preferably from 50 to 190 gf/18 mm, more preferably from 60 to 180 gf/18 mm. The peeling strength can be controlled according to the method described hereinabove as the method for controlling the stress necessary for peeling the label (substrate layer (A)).

EXAMPLES

The invention is described more concretely with reference to Examples and Test Examples given below. In the following Examples, the material used, its amount and ratio, the details of the treatment and the treatment process may be suitably modified or changed not overstepping the spirit and the scope of the invention. Accordingly, the invention should not be limitatively interpreted by the Examples mentioned below.

Examples 1 to 19, Comparative Examples 1 to 7

Laminate resin films (Examples 1 to 19, Comparative Examples 1 to 7) were produced according to the process mentioned below. Details of the material used are shown in Table 1. In the Table, "MFR" means melt flow rate. In Table 2 and Table 3, there are shown the type and the amount (% by weight) of the material used in producing the laminate resin films, the stretching condition, the overall thickness and the thickness of the layer [B], and the presence or absence of the layer [C]. The number of the material shown in Table 2 and Table 3 corresponds to the number of the material shown in Table 1.

Figure 2:
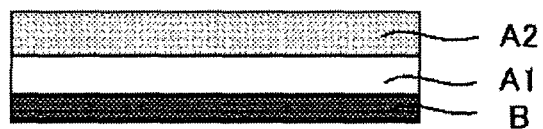
[FIG. 2] This is a cross-sectional view of another embodiment of the readily removable film of the invention.

In Examples 1 to 18 and Comparative Examples 1 to 5, the mixture [A1] shown in Table 2 or Table 3 was melt-kneaded in an extruder set at 250° C., then sheet-like extruded out through a die, and cooled down to 70° C. in a cooling unit to give a single-layer unstretched sheet. The unstretched sheet was heated at 145° C., and then stretched by 5 times between rolls in the longitudinal direction to give a longitudinally monoaxially stretched film. Next, the mixture [A2] shown in Table 2 or Table 3 was melt-kneaded in an extruder set at 250° C., then sheet-like extruded out through a die, and laminated on one surface of the longitudinally monoaxially stretched film, and the mixture [B] shown in Table 2 or Table 3 was melt-kneaded in a different extruder set at 250° C., then sheet-like extruded out through a die, and laminated on the other surface of the longitudinally monoaxially stretched film. The laminate was heated at 158° C., and stretched in the lateral direction by 9 times using a tenter stretcher, thereby giving a monoaxially-stretched/biaxially-stretched/monoaxially-stretched three-layer laminate resin film (see FIG. 2).

Especially in Example 9, the laminate resin film obtained in Example 2 was printed in gray on the surface on the side of the layer [B] thereof, using a gravure ink (trade name: XS-756, by DIC Graphics) and a gravure printer, thereby producing a laminate resin film having a mask layer (C) formed thereon.

In Example 19, the mixture [A2], the mixture [A1] and the mixture [B] shown in Table 3 were separately melt-kneaded in three extruders set at 250° C., then laminated in a multi-layer die through a feed block and a multi-manifold, and co-extruded as a sheet, and cooled down to 70° C. in a cooling unit to give a three-layer unstretched sheet. The unstretched sheet was heated at 145° C., stretched between rolls in the longitudinal direction by 5 times, then further heated at 158° C. and stretched in the lateral direction by 9 times, using a tenter stretcher, thereby giving a biaxially-stretched/biaxially-stretched/biaxially-stretched three-layer laminate resin film (see FIG. 2).

In Comparative Example 6, the mixture [A1] and the mixture [B] shown in Table 3 were separately melt-kneaded in two extruders set at 250° C., then laminated in a multilayer die through a feed block and a multi-manifold, and co-extruded as a sheet, and cooled down to 70° C. in a cooling unit to give a two-layer unstretched sheet. The unstretched sheet was heated at 145° C., and stretched between rolls in the longitudinal direction by 5 times to give a longitudinally monoaxially stretched film. Next, the mixture [A2] shown in Table 3 was melt-kneaded in an extruder set at 250° C., extruded as a sheet through a die, and laminated on the side of [A1] of the above, longitudinally monoaxially stretched film. The laminate was heated at 158° C. and stretched in the lateral direction by 9 times, using a tenter stretcher, thereby giving a monoaxially-stretched/biaxially-stretched/biaxially-stretched three-layer laminate resin film (see FIG. 2).

In producing the laminate resin film of Example 2, the resin discharge rate from the extruder was varied, and the mixture [A2] and the mixture [B] were laminated on both surfaces of the longitudinally monoaxially stretched film. Thus produced, the laminate is the laminate resin film of Comparative Example 7.

Example 20

Onto the surface on the side of the layer [A2] of the laminate resin film obtained in Example 2, a coating liquid having the composition mentioned below was applied to be a solid coating amount of about 2.0 g/m² thereon, using a gravure coater, and dried to thereby form a coat layer (D) favorable for water-based inkjet printing.

<<Composition of Coating Liquid>>

| | |
|---|---|
| Synthetic silica powder (trade name "Mizukasil P-78D", mean particle size 8 μm, by Mizusawa Chemical Industry) | 100 parts by weight |
| Polyvinyl alcohol (trade name "Kuraray Poval PVA-117", by Kuraray) | 30 parts by weight |
| Epichlorohydrin adduct to polyamide polyamine (trade name "WS4082" by Seiko PMC) | 10 parts by weight |
| Sodium polyacrylate (chemical reagent, by Wako Pure Chemical Industry) | 5 parts by weight |
| Water | 1600 parts by weight |

Example 21

A metal foil was formed through transfer vapor deposition on the surface on the side of the layer [A2] of the laminate resin film obtained in Example 2, and onto the metal foil surface, a coating liquid containing a polyamide polyamine resin (trade name "Topaz 17 Liquid", by Toyo Ink) was applied to be a solid coating amount of about 0.5 g/m² thereon, using a gravure coater, and dried thereby form a coat layer (D) favorable for printing with a wet electrophotographic printer (for example, trade name "Indigo WS4000", by Hewlett-Packard).

In all those laminate resin films produced herein, the thickness ratio of the layer [A1] to the layer [A2] was 1/24.

TABLE 1

| Material | Material No. | Details |
|---|---|---|
| Crystalline Polypropylene Resin | 1 | propylene homopolymer (trade name: Novatec PP MA4U, by Nippon Polypro, MFR: 5 g/10 min (230° C., 2.16 kg load), melting point: 164° C. (DSC peak temperature), density: 0.9082 g/cm³, degree of crystallinity: 67.5%) |
| | 2 | propylene homopolymer (trade name: Novatec PP MA3AQ, by Nippon Polypro, MFR: 12 g/10 min (230° C., 2.16 kg load), melting point: 164° C. (DSC peak temperature), density: 0.9062 g/cm³, degree of crystallinity: 65.2%) |
| | 3 | propylene homopolymer (trade name: Novatec PP MA1Q, by Nippon Polypro, MFR: 20 g/10 min (230° C., 2.16 kg load), melting point: 164° C. (DSC peak temperature), density: 0.9067 g/cm³, degree of crystallinity: 65.8%) |
| Polypropylene Resin | 4 | propylene homopolymer (trade name: Novatec PP FY4, by Nippon Polypro, MFR: 5 g/10 min (230° C., 2.16 kg load), melting point: 164° C. (DSC peak temperature), density: 0.9055 g/cm³, degree of crystallinity: 64.4%) |
| | 5 | propylene homopolymer (trade name: Novatec PP MA8Q, by Nippon Polypro, MFR: 0.8 g/10 min (230° C., 2.16 kg load), melting point: 164° C. (DSC peak temperature), density: 0.9038 g/cm³, degree of crystallinity: 62.5%) |
| Thermo-plastic Resin Immiscible with Crystalline Polypropylene Resin | 6 | high-density polyethylene (trade name: Novatec HD HJ381, by Nippon Polyethylene, MFR: 10 g/10 min (190° C., 2.16 kg load), melting point: 133° C. (DSC peak temperature)) |
| | 7 | high-density polyethylene (trade name: Novatec HD HJ590N, by Nippon Polyethylene, MFR: 40 g/10 min (190° C., 2.16 kg load), melting point: 133° C. (DSC peak temperature)) |
| | 8 | high-density polyethylene (trade name: Novatec HD HJ360, by Nippon Polyethylene, MFR: 5 g/10 min (190° C., 2.16 kg load), melting point: 133° C. (DSC peak temperature)) |
| | 9 | ethylene/cyclic olefin copolymer (trade name: Apel APL6013T, by Mitsui Chemical, MFR: 15 g/10 min (260° C., 2.16 kg load), glass transition temperature: 125° C.) |
| | 10 | styrenic elastomer (trade name: Dynaron 1320P, by JSR, styrene content: 10%, MFR: 3.5 g/10 min (230° C., 2.16 kg load) |
| Inorganic Fine Powder | 11 | heavy calcium carbonate (trade name: Softon 1800, by Bihoku Funka Kogyo, dry ground product, mean particle size: 1.25 μm (air permeability method)) |
| | 12 | heavy calcium carbonate (trade name: Caltex 7, by Maruo Calcium, dry ground product, mean particle size: 1.25 μm) |
| | 13 | heavy calcium carbonate (trade name: Softon 3200, by Bihoku Funka Kogyo, dry ground product, mean particle size: 0.7 μm (air permeability method)) |

TABLE 1-continued

| Material | Material No. | Details |
|---|---|---|
| | 14 | surface-treated calcium carbonate (trade name: AFF-Z, by Fimatec - During wet grinding, this was surface-treated with a water-soluble cationic surfactant having a mean molecular weight of 55,000, then ground and further surface-treated with an anionic surfactant. This has a mean particle size of 1.2 μm.) |
| | 15 | maleic acid-modified polypropylene (trade name: Umex 1001, by Sanyo Chemical Industry, softening point: 154° C.) |
| Dispersant | 16 | silanol-modified polypropylene (trade name: Linclon PP XPM800HM, by Mitsubishi Chemical, MFR: 16 g/10 min (230° C., 2.16 kg load) |

TABLE 2

| | Mixture [A2] | | Mixture [A1] | | Mixture [B] | | | | Thickness (μm) | | | |
|---|---|---|---|---|---|---|---|---|---|---|---|---|
| | material | amount added (% by weight) | material | amount added (% by weight) | material | amount added (% by weight) | proportion of immiscible resin | Stretching Mode of Each Layer | Draw Ratio of Layer [B] | all layers | layer [B] | Presence of Layer [C] |
| Comparative Example 1 | 2 | 34 | 2 | 50 | 1 | 20.5 | 85 | [A2] monoaxial | 9 | 101 | 10 | no |
| | 5 | 20 | 5 | 30 | 6 | 17.5 | | [A1] biaxial | | | | |
| | 11 | 45 | 11 | 20 | 14 | 60 | | [B] monoaxial | | | | |
| | 15 | 1 | | | 15 | 2 | | | | | | |
| Example 1 | 2 | 34 | 2 | 50 | 1 | 18 | 111 | [A2] monoaxial | 9 | 101 | 9 | no |
| | 5 | 20 | 5 | 30 | 6 | 20 | | [A1] biaxial | | | | |
| | 11 | 45 | 11 | 20 | 14 | 60 | | [B] monoaxial | | | | |
| | 15 | 1 | | | 15 | 2 | | | | | | |
| Example 2 | 2 | 34 | 2 | 50 | 1 | 15.5 | 145 | [A2] monoaxial | 9 | 98 | 10 | no |
| | 5 | 20 | 5 | 30 | 6 | 22.5 | | [A1] biaxial | | | | |
| | 11 | 45 | 11 | 20 | 14 | 60 | | [B] monoaxial | | | | |
| | 15 | 1 | | | 15 | 2 | | | | | | |
| Example 3 | 2 | 34 | 2 | 50 | 1 | 13 | 192 | [A2] monoaxial | 9 | 100 | 10 | no |
| | 5 | 20 | 5 | 30 | 6 | 25 | | [A1] biaxial | | | | |
| | 11 | 45 | 11 | 20 | 14 | 60 | | [B] monoaxial | | | | |
| | 15 | 1 | | | 15 | 2 | | | | | | |
| Example 4 | 2 | 34 | 2 | 50 | 1 | 10.5 | 262 | [A2] monoaxial | 9 | 100 | 9 | no |
| | 5 | 20 | 5 | 30 | 6 | 27.5 | | [A1] biaxial | | | | |
| | 11 | 45 | 11 | 20 | 14 | 60 | | [B] monoaxial | | | | |
| | 15 | 1 | | | 15 | 2 | | | | | | |
| Comparative Example 2 | 2 | 34 | 2 | 50 | 1 | 8 | 375 | [A2] monoaxial | 9 | 101 | 10 | no |
| | 5 | 20 | 5 | 30 | 6 | 30 | | [A1] biaxial | | | | |
| | 11 | 45 | 11 | 20 | 14 | 60 | | [B] monoaxial | | | | |
| | 15 | 1 | | | 15 | 2 | | | | | | |
| Comparative Example 3 | 2 | 34 | 2 | 50 | 3 | 20 | 0 | [A2] monoaxial | 9 | 95 | 10 | no |
| | 5 | 20 | 5 | 30 | 5 | 18 | | [A1] biaxial | | | | |
| | 11 | 45 | 11 | 20 | 14 | 60 | | [B] monoaxial | | | | |
| | 15 | 1 | | | 15 | 2 | | | | | | |
| Example 5 | 2 | 34 | 2 | 50 | 1 | 13 | 192 | [A2] monoaxial | 9 | 102 | 10 | no |
| | 5 | 20 | 5 | 30 | 7 | 25 | | [A1] biaxial | | | | |
| | 11 | 45 | 11 | 20 | 14 | 60 | | [B] monoaxial | | | | |
| | 15 | 1 | | | 15 | 2 | | | | | | |
| Example 6 | 2 | 34 | 2 | 50 | 1 | 13 | 192 | [A2] monoaxial | 9 | 98 | 8 | no |
| | 5 | 20 | 5 | 30 | 8 | 25 | | [A1] biaxial | | | | |
| | 11 | 45 | 11 | 20 | 14 | 60 | | [B] monoaxial | | | | |
| | 15 | 1 | | | 15 | 2 | | | | | | |
| Example 7 | 2 | 34 | 2 | 50 | 1 | 15.5 | 145 | [A2] monoaxial | 9 | 96 | 8 | no |
| | 5 | 20 | 5 | 30 | 9 | 22.5 | | [A1] biaxial | | | | |
| | 11 | 45 | 11 | 20 | 14 | 60 | | [B] monoaxial | | | | |
| | 15 | 1 | | | 15 | 2 | | | | | | |
| Example 8 | 2 | 34 | 2 | 50 | 1 | 15.5 | 145 | [A2] monoaxial | 9 | 101 | 10 | no |
| | 5 | 20 | 5 | 30 | 10 | 22.5 | | [A1] biaxial | | | | |
| | 11 | 45 | 11 | 20 | 14 | 60 | | [B] monoaxial | | | | |
| | 15 | 1 | | | 15 | 2 | | | | | | |
| Example 9 | 2 | 34 | 2 | 50 | 1 | 15.5 | 145 | [A2] monoaxial | 9 | 98 | 10 | yes (gray printing) |
| | 5 | 20 | 5 | 30 | 6 | 22.5 | | [A1] biaxial | | | | |
| | 11 | 45 | 11 | 20 | 14 | 60 | | [B] monoaxial | | | | |
| | 15 | 1 | | | 15 | 2 | | | | | | |
| Example 10 | 2 | 34 | 2 | 50 | 1 | 15.5 | 145 | [A2] monoaxial | 9 | 93 | 2 | no |
| | 5 | 20 | 5 | 30 | 6 | 22.5 | | [A1] biaxial | | | | |
| | 11 | 45 | 11 | 20 | 14 | 60 | | [B] monoaxial | | | | |
| | 15 | 1 | | | 15 | 2 | | | | | | |

TABLE 2-continued

| | Mixture [A2] | | Mixture [A1] | | Mixture [B] | | | | Draw Ratio of Layer [B] | Thickness (μm) | | Presence of Layer [C] |
|---|---|---|---|---|---|---|---|---|---|---|---|---|
| | material | amount added (% by weight) | material | amount added (% by weight) | material | amount added (% by weight) | proportion of immiscible resin | Stretching Mode of Each Layer | | all layers | layer [B] | |
| Example 11 | 2 | 34 | 2 | 50 | 1 | 15.5 | 145 | [A2] monoaxial | 9 | 111 | 28 | no |
| | 5 | 20 | 5 | 30 | 6 | 22.5 | | [A1] biaxial | | | | |
| | 11 | 45 | 11 | 20 | 14 | 60 | | [B] monoaxial | | | | |
| | 15 | 1 | | | 15 | 2 | | | | | | |

TABLE 3

| | Mixture [A2] | | Mixture [A1] | | Mixture [B] | | | | Draw Ratio of Layer [B] | Thickness (μm) | | Presence of Layer [C] |
|---|---|---|---|---|---|---|---|---|---|---|---|---|
| | material | amount added (% by weight) | material | amount added (% by weight) | material | amount added (% by weight) | proportion of immiscible resin | Stretching Mode of Each Layer | | all layers | layer [B] | |
| Comparative Example 4 | 2 | 34 | 2 | 50 | 1 | 26 | 146 | [A2] monoaxial | 9 | 100 | 10 | no |
| | 5 | 20 | 5 | 30 | 6 | 38 | | [A1] biaxial | | | | |
| | 11 | 45 | 11 | 20 | 14 | 35 | | [B] monoaxial | | | | |
| | 15 | 1 | | | 15 | 2 | | | | | | |
| Example 12 | 2 | 34 | 2 | 50 | 1 | 22 | 145 | [A2] monoaxial | 9 | 100 | 10 | no |
| | 5 | 20 | 5 | 30 | 6 | 32 | | [A1] biaxial | | | | |
| | 11 | 45 | 11 | 20 | 14 | 45 | | [B] monoaxial | | | | |
| | 15 | 1 | | | 15 | 1 | | | | | | |
| Example 13 | 2 | 34 | 2 | 50 | 1 | 13.5 | 144 | [A2] monoaxial | 9 | 101 | 10 | no |
| | 5 | 20 | 5 | 30 | 6 | 19.5 | | [A1] biaxial | | | | |
| | 11 | 45 | 11 | 20 | 14 | 65 | | [B] monoaxial | | | | |
| | 15 | 1 | | | 15 | 2 | | | | | | |
| Comparative Example 5 | 2 | 34 | 2 | 50 | 1 | 9 | 156 | [A2] monoaxial | 9 | 100 | 10 | no |
| | 5 | 20 | 5 | 30 | 6 | 14 | | [A1] biaxial | | | | |
| | 11 | 45 | 11 | 20 | 14 | 75 | | [B] monoaxial | | | | |
| | 15 | 1 | | | 15 | 2 | | | | | | |
| Example 14 | 2 | 34 | 2 | 50 | 1 | 15.5 | 135 | [A2] monoaxial | 9 | 98 | 10 | no |
| | 5 | 20 | 5 | 30 | 6 | 21 | | [A1] biaxial | | | | |
| | 11 | 45 | 11 | 20 | 13 | 20 | | [B] monoaxial | | | | |
| | 15 | 1 | | | 14 | 42 | | | | | | |
| | | | | | 15 | 1.5 | | | | | | |
| Example 15 | 2 | 34 | 2 | 50 | 1 | 18 | 150 | [A2] monoaxial | 9 | 98 | 10 | no |
| | 5 | 20 | 5 | 30 | 6 | 27 | | [A1] biaxial | | | | |
| | 11 | 45 | 11 | 20 | 14 | 55 | | [B] monoaxial | | | | |
| | 15 | 1 | | | | | | | | | | |
| Example 16 | 2 | 34 | 2 | 50 | 1 | 16 | 147 | [A2] monoaxial | 9 | 100 | 10 | no |
| | 5 | 20 | 5 | 30 | 6 | 23.5 | | [A1] biaxial | | | | |
| | 11 | 45 | 11 | 20 | 14 | 60 | | [B] monoaxial | | | | |
| | 15 | 1 | | | 15 | 0.5 | | | | | | |
| Example 17 | 2 | 34 | 2 | 50 | 1 | 10 | 150 | [A2] monoaxial | 9 | 102 | 10 | no |
| | 5 | 20 | 5 | 30 | 6 | 15 | | [A1] biaxial | | | | |
| | 11 | 45 | 11 | 20 | 14 | 60 | | [B] monoaxial | | | | |
| | 15 | 1 | | | 15 | 15 | | | | | | |
| Example 18 | 2 | 34 | 2 | 50 | 1 | 15.5 | 145 | [A2] monoaxial | 9 | 102 | 10 | no |
| | 5 | 20 | 5 | 30 | 6 | 22.5 | | [A1] biaxial | | | | |
| | 11 | 45 | 11 | 20 | 14 | 60 | | [B] monoaxial | | | | |
| | 15 | 1 | | | 16 | 2 | | | | | | |
| Example 19 | 2 | 34 | 2 | 50 | 1 | 15.5 | 145 | [A2] biaxial | 45 | 95 | 5 | no |
| | 5 | 20 | 5 | 30 | 6 | 22.5 | | [A1] biaxial | | | | |
| | 11 | 45 | 11 | 20 | 14 | 60 | | [B] biaxial | | | | |
| | 15 | 1 | | | 15 | 2 | | | | | | |
| Comparative Example 6 | 2 | 34 | 2 | 50 | 2 | 18 | 0 | [A2] monoaxial | 45 | 60 | 1 | no |
| | 5 | 20 | 5 | 30 | 5 | 20 | | [A1] biaxial | | | | |
| | 11 | 45 | 11 | 20 | 11 | 62 | | [B] biaxial | | | | |
| | 15 | 1 | | | | | | | | | | |
| Comparative Example 7 | 2 | 34 | 2 | 50 | 1 | 15.5 | 145 | [A2] unstretched | 1 | 113 | 20 | no |
| | 5 | 20 | 5 | 30 | 6 | 22.5 | | [A1] monoaxial | | | | |
| | 11 | 45 | 11 | 20 | 14 | 60 | | [B] unstretched | | | | |
| | 15 | 1 | | | 15 | 2 | | | | | | |

Test Example 1

The laminate resin films produced in Examples and Comparative Examples were tested and evaluated in point of the printability, the degree of opacity, the liquid absorption capacity, the peeling strength, the peelability from gypsum board, the adhesiveness to and the peelability from bottle, the masking capability, the re-sticking workability and the recyclability thereof. The details of the tests are described below.

[Printability]

An adhesive tape (by Nichiban, trade name "Cellotape", brand name "CT-18") was stuck to the ink surface of the laminate resin film that had been gravure-printed on the surface on the side of [A2], pressed fully with fingers, and then the unstuck part of the adhesive part was pulled in such a manner that the angle between the unstuck part and the laminate resin film could be 90 degrees whereby the adhesive tape was peeled away by hand at a rate of about 1000 mm/sec. Thus peeled, the condition of the ink surface was checked according to the following standards, and evaluated in the following 4 ranks.

○○: No ink peeled.
○: A part of ink peeled owing to the rupture of the material part of the film, but the sample has no practical problem.
Δ: Peeling was against resistance, but almost all ink peeled; and the sample has some practical problem.
×: All ink peeled with no resistance in peeling, and the sample is impracticable.

[Degree of Opacity]

According to JIS-P-8149, a black and white standard plate was attached to the back side (the side of [B]) of the laminate resin film, and the light reflectivity thereon was measured. The light reflectivity ratio (single sheet luminous reflectance/intrinsic luminous reflectance) was expressed as percentage to be the degree of opacity of the film.

[Liquid Absorption Capacity]

The liquid absorption capacity was determined by a Bristow liquid absorption test according to JAPAN TAPPI No. 51:2000. Concretely, using Kumagai Riki Kogyo's Bristow tester Model II, 20 µl of a mixture prepared by mixing ion-exchanged water and red aqueous ink in a ratio of 20/1 was dropwise added to the sample under no pressure given thereto, and the liquid transfer amount for 50 ms was measured.

[Peeling Strength]

Each laminate resin film was stored in a temperature-controlled room (temperature 20° C., relative humidity 65%) for 12 hours, and then an adhesive tape (by Nichiban, trade name "Cellotape", brand name "CT-18") was stuck to the side of the readily removable layer (B) of the film, and cut in a length of 100 mm. Using a tensile tester (Shimadzu's trade name "AUTOGRAPH"), the adhesive tape was pulled at a pulling rate of 300 mm/min and at an angle of 180°, thereby causing removal of the adhesive tape from the substrate layer (A), whereupon the stress under which the peeling was stable was measured with a load cell. Each laminate resin film was thus analyzed in both the lateral direction and the longitudinal direction. The data in the two directions were averaged, and the resulting mean value indicates the peeling strength. The adhesive tape used here had a width of 18 mm.

[Peelability from Gypsum Board]

Each laminate resin film was cut into a square piece of 10 cm×10 cm. A water-based adhesive mainly comprising starch (mixture prepared by mixing Yayoi Chemical Industry's trade name "Ruamild", Yayoi Chemical Industry's trade name "Pulasol 100S" and water in a ratio of 5/1/4) was applied on the side of the readily removable layer (B) of the sample to be a solid coating amount of 8 g/m², using an automatic wallpaper sizing machine (by Kyokuto Sanki), and the sample was stuck to a gypsum board (Yoshino Gypsum's trade name "Tiger Board"). This was stored at room temperature for 1 week, and tested for the following (1) peeling starting behavior and (2) peeling propagation behavior.

(1) Peeling Starting Behavior

One of the four sides of the laminate resin film was clawed so that 1 cm from the end thereof was peeled from the gypsum board. The peeled side was nipped with fingers, and peeled from the gypsum board, whereupon the behavior before the start of peeling through cohesion failure in the readily removable layer (B) was inspected from that distance, and the sample was evaluated in the following four ranks. In peeling the resin film from the gypsum board by hand, the angle between the gypsum board surface and the peeling part of the substrate layer (A) was kept at about 135°, and the peeling part of the laminate resin film was pulled.

○○: The readily removable layer (B) immediately started to peel (within less than 1 mm).
○: A length of from 1 to 2 mm was required before the start of peeling of the readily removable layer (B).
Δ: A length of from 3 to 9 mm was required before the start of peeling of the readily removable layer (B).
×: A length of at least 10 mm was required before the start of peeling of the readily removable layer (B).

(2) Peeling Propagation Behavior

An adhesive tape (by Nichiban, trade name "Cellotape", brand name "CT-18") was stuck to the full length of one side of the four sides of the laminate resin film, in the direction of the side thereof so that the sample could be well held by hand. In that condition, the peeling part of the substrate layer (A) was pulled while the angle between the gypsum board surface and the substrate layer (A) was kept at about 135° to thereby peel the substrate layer (A) from the gypsum board. In this case, the peeling propagation behavior and the peeling force of the readily removable layer (B) were evaluated in the following four ranks.

○○: The peeling force was light, and the peeling propagated cleanly on the entire surface.
○: The peeling force was somewhat heavy, but the peeling propagated cleanly on the entire surface.
Δ: The peeling force was extremely heavy, but the peeling propagated cleanly on the entire surface.
×: The peeling could not propagate on the entire surface, and the layer broke on the way.

[Adhesiveness to and Peelability from Bottle]

Each laminate resin film was cut into a square piece of 5 cm×5 cm, a commercially-available water-based adhesive (T&K TOKA's trade name "Fujiat AL-8L") was applied onto the side of the readily removable layer (B) to be a solid coating amount of 8 g/m², using an automatic sizing machine (by TY Seiki), and then this was stuck to a glass bottle. After stored at room temperature for 1 week, this was evaluated in point of (1) the adhesiveness to the bottle, (2) the peeling starting behavior, and (3) the peeling propagation behavior.

(1) Adhesiveness to Bottle

One of the four sides of the laminate resin film was clawed so that 1 cm from the end thereof was peeled from the bottle. The peeled side was nipped with fingers, and peeled from the bottle, whereupon the behavior before the start of peeling of the readily removable layer (B) was inspected, and the sample was evaluated in the following three ranks. In peeling the resin film from the bottle by hand, the angle between the bottle surface and the peeling part of the laminate resin film was kept at about 135°, and the peeling part of the laminate resin film was pulled.

◯: In peeling, the substrate readily peeled or broke.

Δ: Only the end of the label readily peeled or broke.

×: The adhesive did not dry and the film did not adhere to the bottle.

Regarding the (2) peeling starting behavior and the (3) peeling propagation behavior, the sample was evaluated according to the same method and under the same criteria as those in the above-mentioned test with gypsum board ((1) Peeling Starting Behavior and (2) Peeling Propagation Behavior).

[Masking Capability]

26 alphabet letters of 10-point letter size were printed on a postcard. A water-based adhesive mainly comprising starch (mixture prepared by mixing Yayoi Chemical Industry's trade name "Ruamild", Yayoi Chemical Industry's trade name "Pulasol 100S" and water in a ratio of 5/1/4) was applied on the side of the readily removable layer (B) of each laminate resin film to be a solid coating amount of 8 g/m², and the film was stuck to the postcard. From the visibility of the letters through the laminate resin film, the masking capability of the film was evaluated in the following four ranks.

◯◯: No letters were seen at all, and the masking capability was good.

◯: The letters could not be read at all, and the masking capability was good.

Δ: A part of the letters could be read, and the masking capability was somewhat not good.

×: All the letters could be read, and the masking capability was not good.

[Re-Sticking Workability]

A water-based adhesive mainly comprising starch (mixture prepared by mixing Yayoi Chemical Industry's trade name "Ruamild", Yayoi Chemical Industry's trade name "Pulasol 100S" and water in a ratio of 5/1/4) was applied on the side of the readily removable layer (B) of each laminate resin film (in case where the film was lined, the adhesive was applied to the side of the lining) to be a solid coating amount of 8 g/m², using an automatic sizing machine (by Kyokuto Sanki), and the film was stuck to a gypsum board (Yoshino Gypsum's trade name, "Tiger Board"). This was stored at room temperature for 1 week, and then the laminate resin film was peeled from the gypsum board according to the same method as that for the peeling starting test with gypsum board mentioned above. Next, the same water-based adhesive was applied to the peeled side of the peeled laminate resin film to be a solid coating amount of 8 g/m², using an automatic sizing machine (by Kyokuto Sanki), and this was stuck to the other side of the gypsum board to which nothing had been stuck, and its appearance was checked. Further, this was stored at room temperature for 1 week, and then one of the four sides of the laminate resin film was clawed so that 1 cm from the end thereof was peeled again from the gypsum board. The peeled side was nipped with fingers, and peeled from the gypsum board, whereupon the condition of the peeled surface of the readily removable layer (B) was checked and the sample was evaluated in the following three ranks. In peeling the resin film from the gypsum board by hand, the angle between the gypsum board surface and the peeling part of the laminate resin film was kept at about 135°, and the peeling part of the laminate resin film was pulled.

◯: The re-stuck laminate resin film did not show any appearance failure with irregularities, and in peeling, the film again peeled uniformly from the part of the readily removable layer (B) thereof.

Δ: The re-stuck laminate resin film showed some appearance failure with irregularities, and peeling the readily removable layer (B) from the re-stuck surface was not uniform, and the film involved practical problem.

×: The re-stuck laminate resin film showed some appearance failure with irregularities. Since the film peeled from the re-stuck surface both on the film side and on the adherend side, and the peeling was extremely nonuniform. The film is impracticable.

[Recyclability]

The wallpaper tested in the above-mentioned evaluation of "Adhesiveness to Wallpaper" was peeled from the wall surface after 1 month, according to the same method as that for the above-mentioned peeling start test with gypsum board, and the peeled wallpaper was ground into chips, again melt-kneaded in a double-screw extruder set at 225° C. and equipped with a 100-mesh screen pack, and extruded out. In this process, the condition of the screen pack was checked as to whether or not it clogged, fumed or discolored, from which the possibility of re-melting extrusion of the wallpaper (resin regeneration) was determined. In case where the screen pack did not clog, did not fume and did not discolor to secure re-melting extrusion (resin generation) of the tested sample, the sample was evaluated as "good".

The test results of the above-mentioned evaluation items are collectively shown in Table 4.

TABLE 4

| | | | | | Gypsum Board (adherend) | | Glass Bottle (adherend) | | | | | |
|---|---|---|---|---|---|---|---|---|---|---|---|---|
| | Print-ability | Degree of Opacity (%) | Liquid Absorption Capacity (ml/m²) | Peeling Strength (gf/18 mm) | (1) peeling starting behavior | (2) peeling propagation behavior | (1) adhesiveness | (2) peeling starting behavior | (3) peeling propagation behavior | Masking Capability | Re-sticking Workability | Recyclability (mesh clogging) |
| Comparative Example 1 | ◯◯ | 97 | 7.0 | 200 | Δ | × | ◯ | × | × | ◯ | × | clogged |
| Example 1 | ◯◯ | 97 | 8.1 | 135 | ◯◯ | ◯◯ | ◯ | ◯◯ | ◯◯ | ◯ | ◯ | good |
| Example 2 | ◯◯ | 97 | 8.9 | 70 | ◯◯ | ◯◯ | ◯ | ◯◯ | ◯◯ | ◯ | ◯ | good |
| Example 3 | ◯◯ | 97 | 7.8 | 93 | ◯◯ | ◯◯ | ◯ | ◯◯ | ◯◯ | ◯ | ◯ | good |
| Example 4 | ◯◯ | 97 | 7.7 | 100 | ◯◯ | ◯◯ | ◯ | ◯◯ | ◯◯ | ◯ | ◯ | good |
| Comparative Example 2 | ◯◯ | 97 | 6.5 | 250 | × | × | ◯ | × | × | ◯ | × | clogged |
| Comparative Example 3 | ◯◯ | 96 | 7.0 | 385 | × | × | ◯ | × | × | ◯ | × | clogged |
| Example 5 | ◯◯ | 97 | 9.5 | 75 | ◯◯ | ◯◯ | ◯ | ◯◯ | ◯◯ | ◯ | ◯ | good |
| Example 6 | ◯◯ | 97 | 7.1 | 173 | ◯◯ | ◯◯ | ◯ | ◯ | ◯ | ◯ | ◯ | good |
| Example 7 | ◯◯ | 97 | 7.5 | 168 | ◯◯ | ◯ | ◯ | ◯◯ | ◯ | ◯ | ◯ | good |
| Example 8 | ◯◯ | 97 | 4.0 | 170 | ◯◯ | ◯◯ | ◯ | ◯ | ◯ | ◯ | ◯ | good |
| Example 9 | ◯◯ | 99 | 6.5 | 70 | ◯◯ | ◯◯ | ◯ | ◯◯ | ◯◯ | ◯◯ | ◯ | good |

TABLE 4-continued

| | Print-ability | Degree of Opacity (%) | Liquid Absorption Capacity (ml/m²) | Peeling Strength (gf/18 mm) | Gypsum Board (adherend) | | Glass Bottle (adherend) | | | Masking Capability | Re-sticking Workability | Recyclability (mesh clogging) |
| | | | | | (1) peeling starting behavior | (2) peeling propagation behavior | (1) adhesiveness | (2) peeling starting behavior | (3) peeling propagation behavior | | | |
|---|---|---|---|---|---|---|---|---|---|---|---|---|
| Example 10 | oo | 96 | 1.8 | 171 | oo | o | o | oo | o | o | o | good |
| Example 11 | oo | 98 | 18.6 | 75 | oo | oo | o | oo | oo | o | o | good |
| Comparative Example 4 | oo | 97 | 0.8 | 230 | x | x | x | x | x | o | x | clogged |
| Example 12 | oo | 97 | 1.5 | 172 | oo | o | o | o | o | o | o | good |
| Example 13 | oo | 97 | 9.7 | 68 | oo | oo | o | oo | oo | o | o | good |
| Comparative Example 5 | colspan | In melt-extruding the mixture [B], the resin pressure increase in the extruder was great, and film could not be formed. | | | | | | | | | | |
| Example 14 | oo | 97 | 5.5 | 95 | oo | oo | o | oo | oo | o | o | good |
| Example 15 | oo | 97 | 3.0 | 165 | o | o | o | o | o | o | o | good |
| Example 16 | oo | 97 | 7.8 | 140 | oo | oo | o | oo | oo | o | o | good |
| Example 17 | oo | 97 | 8.2 | 70 | oo | oo | o | oo | oo | o | o | good |
| Example 18 | oo | 97 | 8.5 | 110 | oo | oo | o | oo | oo | o | o | good |
| Example 19 | oo | 97 | 4.1 | 62 | oo | oo | o | oo | oo | o | o | good |
| Comparative Example 6 | oo | 88 | 0.3 | 100 | oo | oo | x | x | x | Δ | x | good |
| Comparative Example 7 | oo | 97 | 0.1 | 40 | x | x | x | x | x | o | x | clogged |

The readily removable multilayer resin stretched film described in Examples in JP-A 2002-200707 was reproduced, and tested according to the same tests as above. The re-sticking workability and the recyclability of Examples 1 to 19 of the invention were obvious excellent as compared with the Examples in JP-A 2002-200707, and the other evaluation results were on the same level in these.

Examples 101 to 116, Comparative Examples 101 to 105

The mixture [A1] shown in Table 5 or Table 6 was melt-kneaded in an extruder set at 250° C., then sheet-like extruded out through a die, and cooled down to 70° C. in a cooling unit to give a single-layer unstretched sheet. The unstretched sheet was again heated at 145° C., and then stretched by 5 times between a large number of rolls in the longitudinal direction, using the peripheral speed difference between the rolls, to thereby give a longitudinally monoaxially stretched film. Next, the mixture [A2] and the mixture [B] shown in Table 5 or Table 6 were separately melt-kneaded in extruders each set at 250° C., then sheet-like extruded out through dies in such a manner that the mixture [A2] could be laminated on one surface of the longitudinally monoaxially stretched film and the mixture [B] could be on the other surface thereof, thereby giving a three-layer laminate of [A2]/[A1]/[B]. Next, the laminate was again heated at 158° C. in an oven, and using a tenter stretcher, this was stretched by 9 times in the lateral direction to give a monoaxially stretched/biaxially stretched/monoaxially stretched three-layer laminate resin film of an in-mold molding label (see FIG. 2). The total thickness of the laminate resin film, and the thickness of the readily removable layer (B) are shown in Table 5 or Table 6.

Example 117

The mixture [A2], the mixture [A1] and the mixture [B] shown in Table 6 were separately melt-kneaded in three extruders set at 250° C., then laminated in a multilayer die through a feed block and a multi-manifold, and co-extruded as a sheet, and cooled down to 70° C. in a cooling unit to give a three-layer unstretched sheet. The unstretched sheet was heated at 145° C., stretched between rolls in the longitudinal direction by 5 times, then further heated at 158° C. and stretched in the lateral direction by 9 times, using a tenter stretcher, thereby giving a biaxially-stretched/biaxially-stretched/biaxially-stretched three-layer laminate resin film of an in-mold molding label of Example 117 (see FIG. 2). The total thickness of the laminate resin film, and the thickness of the readily removable layer (B) are shown in Table 6.

Comparative Example 106

A laminate of an in-mold molding label of Comparative Example 106 was produced in the same manner as in Example 103, except that the mixture [A2] and the mixture [B] were laminated on both surfaces of the longitudinally monoaxially stretched film while the resin discharge rate from the extruder was varied in producing the laminate resin film.

Comparative Example 107

Figure 3:
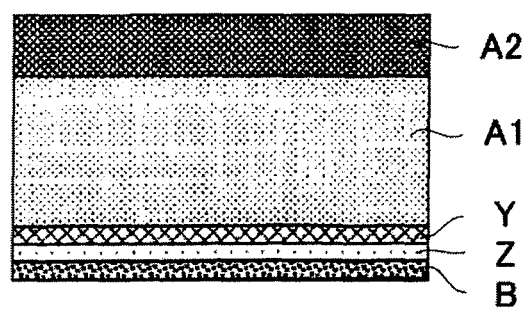
[FIG. 3] This is a cross-sectional view of the in-mold molding label of Comparative Example 107.

A multilayer film of Example 101 in JP-A 2003-295767 was produced to be an in-mold molding label (see FIG. 3). In this, the layer (Y) for enabling interlayer peeling and the layer (B) were separately arranged via the interlayer (C) sandwiched therebetween. The total thickness of the multilayer film was 100 μm, the thickness of the layer (Y) for enabling interlayer peeling was 5 μm, and the thickness of the layer (B) was 5 μm. The layer (B) is a heat-seal layer formed of an ethylene/1-hexene copolymer along, and the surface aperture ratio of the layer was 0%.

Comparative Example 108

Figure 4:
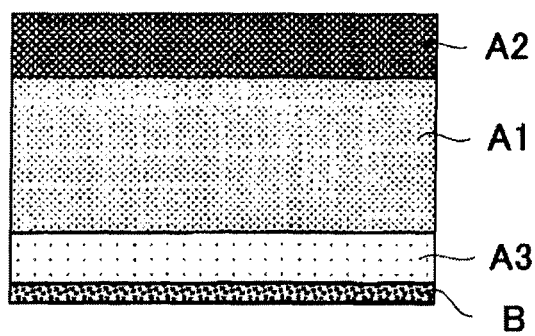
[FIG. 4] This is a cross-sectional view of the in-mold molding label of Comparative Example 108.
Figure 5:
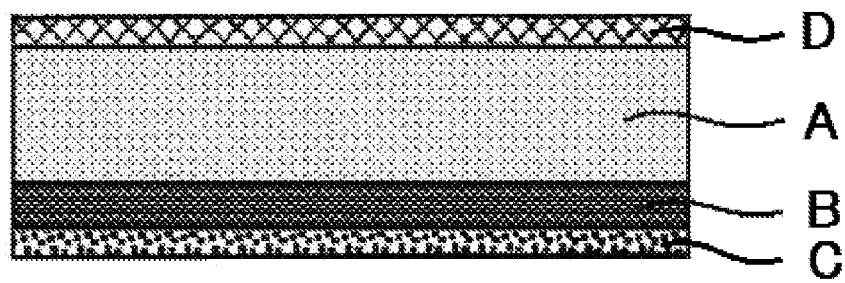

A multilayer film of Example 101 in JP-A 2006-309175 was produced to be an in-mold molding label (see FIG. 4). The propylene homopolymer (Nippon Polypro's trade name: FY4) used for the layer (B) had a melting point of 164° C., a density of 0.9055 g/cm³, and a degree of crystallinity of 64.4%. The substrate layer (A) of this film has a three-layer configuration of layer (A2)/layer (A1)/layer (A3); however, the number of the layers constituting the substrate layer (A) has little influence on the results shown in Table 6.

TABLE 5

| | Mixture [A2] | | Mixture [A1] | | Mixture [B] | | | Stretching Mode of Each Layer | | | Draw Ratio of | Thickness (μm) | |
|---|---|---|---|---|---|---|---|---|---|---|---|---|---|
| | material No. | amount added (% by weight) | material No. | amount added (% by weight) | material No. | amount added (% by weight) | proportion of immiscible resin | layer [A2] | layer [A1] | layer [B] | Layer [B] | all layers | layer [B] |
| Comparative Example 101 | 2 | 34 | 2 | 50 | 1 | 20.5 | 85 | monoaxial | biaxial | monoaxial | 9 | 101 | 10 |
| | 5 | 20 | 5 | 30 | 6 | 17.5 | | | | | | | |
| | 11 | 45 | 11 | 20 | 14 | 60 | | | | | | | |
| | 15 | 1 | | | 15 | 2 | | | | | | | |
| Example 101 | 2 | 34 | 2 | 50 | 1 | 18 | 111 | monoaxial | biaxial | monoaxial | 9 | 101 | 9 |
| | 5 | 20 | 5 | 30 | 6 | 20 | | | | | | | |
| | 11 | 45 | 11 | 20 | 14 | 60 | | | | | | | |
| | 15 | 1 | | | 15 | 2 | | | | | | | |
| Example 102 | 2 | 34 | 2 | 50 | 1 | 15.5 | 145 | monoaxial | biaxial | monoaxial | 9 | 98 | 10 |
| | 5 | 20 | 5 | 30 | 6 | 22.5 | | | | | | | |
| | 11 | 45 | 11 | 20 | 14 | 60 | | | | | | | |
| | 15 | 1 | | | 15 | 2 | | | | | | | |
| Example 103 | 2 | 34 | 2 | 50 | 1 | 13 | 192 | monoaxial | biaxial | monoaxial | 9 | 100 | 10 |
| | 5 | 20 | 5 | 30 | 6 | 25 | | | | | | | |
| | 11 | 45 | 11 | 20 | 14 | 60 | | | | | | | |
| | 15 | 1 | | | 15 | 2 | | | | | | | |
| Example 104 | 2 | 34 | 2 | 50 | 1 | 10.5 | 262 | monoaxial | biaxial | monoaxial | 9 | 100 | 9 |
| | 5 | 20 | 5 | 30 | 6 | 27.5 | | | | | | | |
| | 11 | 45 | 11 | 20 | 14 | 60 | | | | | | | |
| | 15 | 1 | | | 15 | 2 | | | | | | | |
| Comparative Example 102 | 2 | 34 | 2 | 50 | 1 | 8 | 375 | monoaxial | biaxial | monoaxial | 9 | 101 | 10 |
| | 5 | 20 | 5 | 30 | 6 | 30 | | | | | | | |
| | 11 | 45 | 11 | 20 | 14 | 60 | | | | | | | |
| | 15 | 1 | | | 15 | 2 | | | | | | | |
| Comparative Example 103 | 2 | 34 | 2 | 50 | 3 | 20 | 0 | monoaxial | biaxial | monoaxial | 9 | 95 | 10 |
| | 5 | 20 | 5 | 30 | 5 | 18 | | | | | | | |
| | 11 | 45 | 11 | 20 | 14 | 60 | | | | | | | |
| | 15 | 1 | | | 15 | 2 | | | | | | | |
| Example 105 | 2 | 34 | 2 | 50 | 1 | 13 | 192 | monoaxial | biaxial | monoaxial | 9 | 102 | 10 |
| | 5 | 20 | 5 | 30 | 7 | 25 | | | | | | | |
| | 11 | 45 | 11 | 20 | 14 | 60 | | | | | | | |
| | 15 | 1 | | | 15 | 2 | | | | | | | |
| Example 106 | 2 | 34 | 2 | 50 | 1 | 13 | 192 | monoaxial | biaxial | monoaxial | 9 | 98 | 8 |
| | 5 | 20 | 5 | 30 | 8 | 25 | | | | | | | |
| | 11 | 45 | 11 | 20 | 14 | 60 | | | | | | | |
| | 15 | 1 | | | 15 | 2 | | | | | | | |
| Example 107 | 2 | 34 | 2 | 50 | 1 | 15.5 | 145 | monoaxial | biaxial | monoaxial | 9 | 96 | 8 |
| | 5 | 20 | 5 | 30 | 9 | 22.5 | | | | | | | |
| | 11 | 45 | 11 | 20 | 14 | 60 | | | | | | | |
| | 15 | 1 | | | 15 | 2 | | | | | | | |
| Example 108 | 2 | 34 | 2 | 50 | 1 | 15.5 | 145 | monoaxial | biaxial | monoaxial | 9 | 101 | 10 |
| | 5 | 20 | 5 | 30 | 10 | 22.5 | | | | | | | |
| | 11 | 45 | 11 | 20 | 14 | 60 | | | | | | | |
| | 15 | 1 | | | 15 | 2 | | | | | | | |

TABLE 6

| | Mixture [A2] | | Mixture [A1] | | Mixture [B] | | | Stretching Mode of Each Layer | | | Draw Ratio of | Thickness (μm) | |
|---|---|---|---|---|---|---|---|---|---|---|---|---|---|
| | material No. | amount added (% by weight) | material No. | amount added (% by weight) | material No. | amount added (% by weight) | proportion of immiscible resin | layer [A2] | layer [A1] | layer [B] | Layer [B] | all layers | layer [B] |
| Comparative Example 104 | 2 | 34 | 2 | 50 | 1 | 26 | 146 | monoaxial | biaxial | monoaxial | 9 | 100 | 10 |
| | 5 | 20 | 5 | 30 | 6 | 38 | | | | | | | |
| | 11 | 45 | 11 | 20 | 14 | 35 | | | | | | | |
| | 15 | 1 | | | 15 | 2 | | | | | | | |
| Example 109 | 2 | 34 | 2 | 50 | 1 | 22 | 144 | monoaxial | biaxial | monoaxial | 9 | 100 | 10 |
| | 5 | 20 | 5 | 30 | 6 | 32 | | | | | | | |
| | 11 | 45 | 11 | 20 | 14 | 45 | | | | | | | |
| | 15 | 1 | | | 15 | 1 | | | | | | | |
| Example 110 | 2 | 34 | 2 | 50 | 1 | 13.5 | 144 | monoaxial | biaxial | monoaxial | 9 | 101 | 10 |
| | 5 | 20 | 5 | 30 | 6 | 19.5 | | | | | | | |
| | 11 | 45 | 11 | 20 | 14 | 65 | | | | | | | |
| | 15 | 1 | | | 15 | 2 | | | | | | | |

TABLE 6-continued

| | Mixture [A2] | | Mixture [A1] | | Mixture [B] | | | Stretching Mode of Each Layer | | | Draw Ratio of | Thickness (μm) | |
|---|---|---|---|---|---|---|---|---|---|---|---|---|---|
| | material No. | amount added (% by weight) | material No. | amount added (% by weight) | material No. | amount added (% by weight) | proportion of immiscible resin | layer [A2] | layer [A1] | layer [B] | Layer [B] | all layers | layer [B] |
| Comparative Example 105 | 2 | 34 | 2 | 50 | 1 | 9 | 156 | monoaxial | biaxial | monoaxial | 9 | 100 | 10 |
| | 5 | 20 | 5 | 30 | 6 | 14 | | | | | | | |
| | 11 | 45 | 11 | 20 | 14 | 75 | | | | | | | |
| | 15 | 1 | | | 15 | 2 | | | | | | | |
| Example 111 | 2 | 34 | 2 | 50 | 1 | 15.5 | 135 | monoaxial | biaxial | monoaxial | 9 | 98 | 10 |
| | 5 | 20 | 5 | 30 | 6 | 21 | | | | | | | |
| | 11 | 45 | 11 | 20 | 13 | 20 | | | | | | | |
| | 15 | 1 | | | 14 | 42 | | | | | | | |
| | | | | | 15 | 1.5 | | | | | | | |
| Example 112 | 2 | 34 | 2 | 50 | 1 | 13 | 192 | monoaxial | biaxial | monoaxial | 9 | 100 | 10 |
| | 5 | 20 | 5 | 30 | 6 | 25 | | | | | | | |
| | 11 | 45 | 11 | 20 | 13 | 60 | | | | | | | |
| | 15 | 1 | | | 15 | 2 | | | | | | | |
| Example 113 | 2 | 34 | 2 | 50 | 1 | 18 | 150 | monoaxial | biaxial | monoaxial | 9 | 98 | 10 |
| | 5 | 20 | 5 | 30 | 6 | 27 | | | | | | | |
| | 11 | 45 | 11 | 20 | 14 | 55 | | | | | | | |
| | 15 | 1 | | | | | | | | | | | |
| Example 114 | 2 | 34 | 2 | 50 | 1 | 16 | 147 | monoaxial | biaxial | monoaxial | 9 | 100 | 10 |
| | 5 | 20 | 5 | 30 | 6 | 23.5 | | | | | | | |
| | 11 | 45 | 11 | 20 | 14 | 60 | | | | | | | |
| | 15 | 1 | | | 15 | 0.5 | | | | | | | |
| Example 115 | 2 | 34 | 2 | 50 | 1 | 15 | 133 | monoaxial | biaxial | monoaxial | 9 | 101 | 10 |
| | 5 | 20 | 5 | 30 | 6 | 20 | | | | | | | |
| | 11 | 45 | 11 | 20 | 14 | 51 | | | | | | | |
| | 15 | 1 | | | 15 | 14 | | | | | | | |
| Example 116 | 2 | 34 | 2 | 50 | 1 | 13 | 192 | monoaxial | biaxial | monoaxial | 9 | 102 | 10 |
| | 5 | 20 | 5 | 30 | 6 | 25 | | | | | | | |
| | 11 | 45 | 11 | 20 | 14 | 60 | | | | | | | |
| | 15 | 1 | | | 16 | 2 | | | | | | | |
| Example 117 | 2 | 34 | 2 | 50 | 1 | 15.5 | 145 | biaxial | biaxial | biaxial | 45 | 95 | 5 |
| | 5 | 20 | 5 | 30 | 6 | 22.5 | | | | | | | |
| | 11 | 45 | 11 | 20 | 14 | 60 | | | | | | | |
| | 15 | 1 | | | 15 | 2 | | | | | | | |
| Comparative Example 106 | 2 | 34 | 2 | 50 | 1 | 13 | 192 | un-stretched | monoaxial | un-stretched | 1 | 110 | 20 |
| | 5 | 20 | 5 | 30 | 6 | 25 | | | | | | | |
| | 11 | 45 | 11 | 20 | 14 | 60 | | | | | | | |
| | 15 | 1 | | | 15 | 2 | | | | | | | |
| Comparative Example 107 | Multilayer film of Example 1 in JP-A 2003-295767 was used as the in-mold molding label. | | | | | | | | | | | | |
| Comparative Example 108 | Multilayer film of Example 1 in JP-A 2006-309175 was used as the in-mold molding label. | | | | | | | | | | | | |

[Printing]

Using an offset printer (Mitsubishi Heavy Industries' Model Dia II) and an UV offset ink (T&K TOKA's trade name; Bestcure 161), both surfaces of the laminate resin film obtained in Examples and Comparative Examples were printed. Briefly, a character image with a 50% dot design was printed on the side of the substrate layer (A) (mixture [A2]), and a 50% dot pattern was on the side of the readily removable layer (B), and after dried, this was used in molding a resin molded article to be mentioned below.

[Molding of Labeled Resin Molded Article]

[Injection Molding]

Using an injection molding machine (Niigata Engineering's Model NV50ST, clamp capacity: 50 tons, vertical design) and an injection molding split mold to give a resin molded article of a flat plate having a width of 130 mm, a length of 150 mm and a thickness of 1 mm, the in-mold molding label that had been obtained in the above and cut into a size of 100 mm in width and 130 mm in length was fixed on the surface of the female die of the mold fitted to the lower fixed platen in such a manner that the substrate layer (A) of the label could face the mold surface, then the split mold was clamped, and a molten polystyrene (PS Japan's trade name: HIPS433, MFR: 21 g/10 min (200° C., 5 kg load), melting start temperature: about 95° C.) was injected into the mold via the gate part through the injection unit set at 200° C., under a pressure of 745 kgf/cm$^2$, and the molten resin was cooled and solidified while the label was stuck thereto, and thereafter the mold was opened to provide a labeled, flat-shaped PS-made injection-molded article of a labeled resin molded article.

[Blow Molding]

Using a blow molding machine (Placo's Model V-50), an automatic label feeder (by Pentel) and a blow molding split mold to give a bottle container having an inner volume of 1,000 ml, the in-mold molding label that had been obtained in the above and blanked into a size of 109 mm in width and 171 mm in length was fixed in one segmental die of the blow molding split mold by utilizing vacuum in such a manner that the side of the substrate layer (A) of the label could be in contact with the mold. Subsequently, a parison produced through melt extrusion of a high-density polyethylene (Nippon Polyethylene's trade name; Novatec HD HB330, melting point: 133° C.) at 170° C. or 200° C. was introduced between the segmental dies, then the mold was clamped, and thereafter compressed air of 4.2 kg/cm$^2$ was introduced into the parison so that the parison was expanded and airtightly adhered to the mold to be a container while kept in contact with the in-mold molding label, and subsequently, the mold was cooled with cooling water at 10° C. After about 10 seconds, the mold was opened to provide a labeled blow-molded article of a labeled resin molded article.

On the other hand, a labeled blow-molded container of a labeled resin molded article was produced in the same manner as above, except that a polypropylene random copolymer (Nippon Polypro's trade name: Novatec P PEG-8, melting point: 143° C.) was used as the material of the resin molded article and this was melt-extruded at 200° C.

Test Example 2

The in-mold molding labels produced in Examples and Comparative Examples mentioned above were analyzed and evaluated in point of the aperture ratio, the porosity, the arithmetic mean roughness and the peeling strength of the surface on the side of the readily removable layer (B), and of the printability on both surfaces thereof, according to the methods mentioned below. The labeled resin molded articles each having the in-mold molding label attached thereto were tested and evaluated in point of the adhesiveness and the peeling strength thereof, according to the methods mentioned below. The details of the tests are described below, and the results are collectively shown in Table 7.

[Aperture Ratio]

Any desired part was cut out of the laminate resin film sample, and attached to the sample stage, the surface thereof on the side of the readily removable layer (B) was coated with gold through vapor deposition, and using an electronic microscope (Hitachi's scanning microscope S-2400) at 1000-power, the observed region was taken as a photographic picture, then the pores therein were traced on a tracing film and filled up thereon, and the resulting image was processed with an image analyzer (Nireco's Luzex IID Model), and the ratio of the pore area in the observed region was computed and was referred to as the surface aperture ratio of the readily removable layer (B).

[Porosity]

A laminate resin film sample was buried in an epoxy resin and solidified, and then, using a microtome, the film was cut in the direction parallel to the thickness direction thereof (or that is, in the direction vertical to the surface direction) to give a cut section. The cut section was metalized through vapor deposition, and thereafter using an electronic microscope (Hitachi's scanning microscope S-2400) at 3000-power, the cross section was observed. The pore parts in the enlarged image of the readily removable layer (B) were traced on a tracing film and filled up, and the resulting image was processed with an image analyzer (Nireco's Luzex IID Model), and the ratio (%) of the pore area in the observed region was computed and was referred to as the porosity (%) of the readily removable layer (B).

[Arithmetic Mean Roughness]

According to the regulations in JIS-B0601, the arithmetic mean roughness was determined by the use of a surface roughness meter (Kosaka Laboratory's trade name: Surfcorder SE30).

[Peeling Strength of Laminate Resin Film]

For obtaining the indication to the peeling strength in labeled resin molded articles, each laminate resin film sample was stored in a temperature-controlled room (temperature 20° C., relative humidity 65%) for 12 hours, and then an adhesive tape (by Nichiban, trade name "Cellotape", brand name "CT-18") was stuck to the side of the readily removable layer (B) of the film, and cut in a length of 100 mm. Using a tensile tester (Shimadzu's trade name "AUTOGRAPH"), the adhesive tape was pulled at a pulling rate of 300 mm/min and at an angle of 180°, thereby causing removal of the adhesive tape from the substrate layer (A), whereupon the stress under which the peeling was stable was measured with a load cell. Each laminate resin film was thus analyzed in both the lateral direction and the longitudinal direction. The data in the two directions were averaged, and the resulting mean value indicates the peeling strength. The adhesive tape used here had a width of 18 mm.

[Printability (Ink Transfer Evaluation)]

After the above-mentioned printing process, the 50% dot print part of the resin laminate film that had been offset-printed on both sides of the substrate layer (A) and the readily removable layer (B) was visually checked. The number of white spots per A4-size paper was counted for ink transfer evaluation, and the sample was evaluated in the following three ranks.

○: At most 5 white spots, and no problem occurs in practical use.

Δ: From 6 to 20 white spots, and some problem occurs in practical use.

×: 21 or more white spots, and impracticable.

[Adhesiveness in Labeled Resin Molded Article]

Each labeled resin molded article was visually checked as to the presence or absence of wrinkling or blistering between the label and the resin molded article. The sample was evaluated in the following two ranks.

○: Neither wrinkling nor blistering found.

×: Wrinkling or blistering found.

[Peeling Strength in Labeled Resin Molded Article]

The label-stuck part of each labeled resin molded article was cut into a piece having a width of 15 mm and a length of 100 mm. The sample was stored in a temperature-controlled room (temperature 20° C., relative humidity 65%) for 12 hours. Using a tensile tester (Shimadzu's trade name "AUTOGRAPH"), the label was peeled from the molded article via the substrate layer (A) thereof at a pulling rate of 300 mm/min and at an angle of 180°, whereupon the stress under which the peeling was stable is measured with a load cell. Each sample was thus analyzed in both the lateral direction and the longitudinal direction (direction vertical to the stretching direction of the readily removable layer (B)). The data in the two directions were averaged, and the resulting mean value indicates the peeling strength.

TABLE 7

| | Evaluation of In-Mold Molding Label | | | | | Evaluation of Labeled Resin Molded Article (unit of peeling strength: gf/15 mm) | |
|---|---|---|---|---|---|---|---|
| | surface on the side of adhesive layer (B) | | | printability | | injection molding | |
| | aperture | | mean | peeling | side of | side of | PS (resin temperature 200° C.) | |
| | ratio (%) | porosity (%) | roughness (μm) | strength (gf/18 mm) | substrate layer [A2] | adhesive layer [B] | Adhesiveness | peeling strength |
| Comparative Example 101 | 21 | 38 | 1.02 | 200 | ○ | ○ | ○ | 203 |

TABLE 7-continued

| | | | | | | | | |
|---|---|---|---|---|---|---|---|---|
| Example 101 | 29 | 46 | 0.96 | 135 | ○ | ○ | ○ | 145 |
| Example 102 | 31 | 48 | 0.91 | 70 | ○ | ○ | ○ | 130 |
| Example 103 | 27 | 45 | 1.06 | 93 | ○ | ○ | ○ | 138 |
| Example 104 | 26 | 44 | 0.94 | 100 | ○ | ○ | ○ | 148 |
| Comparative Example 102 | 23 | 39 | 0.92 | 250 | ○ | ○ | ○ | 241 |
| Comparative Example 103 | 17 | 36 | 0.32 | 385 | ○ | ○ | ○ | 545 |
| Example 105 | 25 | 46 | 0.89 | 75 | ○ | ○ | ○ | 125 |
| Example 106 | 26 | 42 | 0.99 | 173 | ○ | ○ | ○ | 158 |
| Example 107 | 24 | 40 | 1.05 | 168 | ○ | ○ | ○ | 155 |
| Example 108 | 20 | 38 | 0.93 | 170 | ○ | ○ | ○ | 157 |
| Comparative Example 104 | 12 | 20 | 0.38 | 230 | ○ | ○ | ○ | 280 |
| Example 109 | 19 | 36 | 0.95 | 172 | ○ | ○ | ○ | 158 |
| Example 110 | 33 | 50 | 1.08 | 68 | ○ | ○ | ○ | 128 |
| Comparative Example 105 | In melt-extruding the mixture [B], the resin pressure rapidly increased and the film could not be formed. | | | | | | | |
| Example 111 | 29 | 45 | 0.91 | 95 | ○ | ○ | ○ | 140 |
| Example 112 | 28 | 40 | 1.02 | 90 | ○ | ○ | ○ | 135 |
| Example 113 | 22 | 41 | 0.89 | 165 | ○ | ○ | ○ | 160 |
| Example 114 | 23 | 44 | 0.93 | 140 | ○ | ○ | ○ | 149 |
| Example 115 | 25 | 43 | 0.91 | 132 | ○ | ○ | ○ | 142 |
| Example 116 | 25 | 41 | 0.98 | 110 | ○ | ○ | ○ | 140 |
| Example 117 | 38 | 55 | 1.23 | 62 | ○ | ○ | ○ | 120 |
| Comparative Example 106 | 0 | 0 | 0.15 | 420 | Δ | x | ○ | 490 |
| Comparative Example 107 | 0 | 0 | 2.31 | 100 | ○ | Δ | ○ | 153 |
| Comparative Example 108 | 15 | 13 | 0.67 | 358 | ○ | x | ○ | 515 |

Evaluation of Labeled Resin Molded Article (unit of peeling strength: gf/15 mm)
blow molding

| | PE (parison temperature 170° C.) | | PE (parison temperature 200° C.) | | PP (parison temperature 200° C.) | |
|---|---|---|---|---|---|---|
| | Adhesiveness | peeling strength | Adhesiveness | peeling strength | Adhesiveness | peeling strength |
| Comparative Example 101 | ○ | 165 | ○ | 170 | ○ | 162 |
| Example 101 | ○ | 105 | ○ | 110 | ○ | 118 |
| Example 102 | ○ | 70 | ○ | 60 | ○ | 62 |
| Example 103 | ○ | 75 | ○ | 78 | ○ | 75 |
| Example 104 | ○ | 90 | ○ | 85 | ○ | 85 |
| Comparative Example 102 | ○ | 210 | ○ | 210 | ○ | 200 |
| Comparative Example 103 | ○ | 270 | ○ | 320 | ○ | 345 |
| Example 105 | ○ | 70 | ○ | 62 | ○ | 65 |
| Example 106 | ○ | 138 | ○ | 145 | ○ | 140 |
| Example 107 | ○ | 142 | ○ | 140 | ○ | 130 |
| Example 108 | ○ | 141 | ○ | 153 | ○ | 136 |
| Comparative Example 104 | ○ | 192 | ○ | 207 | ○ | 184 |
| Example 109 | ○ | 137 | ○ | 143 | ○ | 154 |
| Example 110 | ○ | 61 | ○ | 54 | ○ | 56 |
| Comparative Example 105 | In melt-extruding the mixture [B], the resin pressure rapidly increased and the film could not be formed. | | | | | |
| Example 111 | ○ | 80 | ○ | 85 | ○ | 76 |
| Example 112 | ○ | 75 | ○ | 82 | ○ | 72 |
| Example 113 | ○ | 140 | ○ | 137 | ○ | 148 |
| Example 114 | ○ | 126 | ○ | 112 | ○ | 116 |
| Example 115 | ○ | 110 | ○ | 118 | ○ | 105 |
| Example 116 | ○ | 88 | ○ | 91 | ○ | 99 |
| Example 117 | ○ | 55 | ○ | 49 | ○ | 51 |
| Comparative Example 106 | ○ | 336 | ○ | 350 | ○ | 378 |
| Comparative Example 107 | x | 65 | ○ | 85 | x | 35 |
| Comparative Example 108 | ○ | 265 | ○ | 318 | ○ | 305 |

As obvious from the above results, the in-mold molding label of the invention has good printability, and even when the material of the resin molded article to be labeled therewith is variously changed, the label can firmly stuck to the article. In addition, even when the molding condition for the molded article is changed, the label can be well stuck to the article. Accordingly, in the present invention, it is unnecessary to prepare in-mold molding labels individually for resin molded articles in accordance with materials for the articles and with the molding condition such as temperature and others for the articles, or that is, according to the invention, one type of in-mold molding labels may be stuck to various types of resin molded articles that have been molded under different molding condition. On the other hand, according to the invention, the substrate layer (A) of the label can be readily removed from the labeled resin molded article. Consequently, the invention facilitates recycling of resin molded articles.

Reference Signs List
A Substrate Layer
A1, A2, A3 Layers Constituting Substrate Layer
B Readily Removable Layer
Y Layer Enabling Interlayer Peeling
Z Interlayer

The invention claimed is:

1. A labeled resin molded article, comprising an in-mold molding label, which comprises a readily removable film comprising a substrate layer (A) and a readily removable layer (B), stuck to a resin molded article, wherein;
the substrate layer (A) comprises a thermoplastic resin,
the readily removable layer (B) comprises (1) from 30 to 60% by weight of a mixture of a crystalline polypropylene having a degree of crystallinity of at least 65% and a thermoplastic resin immiscible with the crystalline polypropylene resin, wherein the mixture comprises from 105 to 300 parts by weight of the thermoplastic resin immiscible with the crystalline polypropylene resin relative to 100 parts by weight of the crystalline polypropylene resin, and (2) from 40 to 70% by weight of a fine powder,
the readily removable layer (B) is stretched at least mono-axially, and
when the in-mold molding label is peeled from the labeled resin article, the stress needed for the peeling is from 40 to 160 gf/15 mm and the peeling goes on in a mode of cohesion failure inside the readily removable layer (B).

2. The labeled resin molded article of claim 1, wherein the resin molded article comprises at least one thermoplastic resin selected from a group consisting of a polypropylene resin, a polyethylene resin, a polystyrene resin, and a polyethylene terephthalate resin.

3. The labeled resin molded article according to claim 1, which is printed on the surface of the readily removable layer (B) of the in-mold molding label and which is such that, when the in-mold molding label is peeled from the labeled resin molded article, the print remains on the resin molded article.

4. The labeled resin molded article according to claim 1, which is printed on the surface of the readily removable layer (B) of the in-mold molding label and which is such that, when the in-mold molding label is peeled from the labeled resin molded article, the print remains on the label.

5. A wallpaper comprising a readily removable film, which comprises a substrate layer (A) and a readily removable layer (B), and a water-based adhesive layer arranged on the surface of the readily removable layer (B), wherein
the substrate layer (A) contains a thermoplastic resin,
the readily removable layer (B) comprises (1) from 30 to 60% by weight of a mixture of a crystalline polypropylene having a degree of crystallinity of at least 65% and a thermoplastic resin immiscible with the crystalline polypropylene resin, wherein the mixture comprises from 105 to 300 parts by weight of the thermoplastic resin immiscible with the crystalline polypropylene resin relative to 100 parts by weight of the crystalline polypropylene resin, and (2) from 40 to 70% by weight of a fine powder,
the readily removable layer (B) is stretched at least mono-axially, and
the wallpaper is such that, when peeled from a wall, the stress needed for the peeling is from 50 to 180 gf/18 mm and the peeling goes on in a mode of cohesion failure inside the readily removable layer (B).

6. The wallpaper according to claim 5, which is such that, after the wallpaper is peeled from a wall, a part of the readily removable layer (B) remains on the surface of the wall as a thin film thereon, and the residue absorbs a liquid.

* * * * *